US010853837B2

(12) United States Patent
Klimetschek et al.

(10) Patent No.: US 10,853,837 B2
(45) Date of Patent: Dec. 1, 2020

(54) INTEGRATED TESTING, TARGETING AND MEASURING OF WEB SITE COMPONENTS

(71) Applicant: Adobe Inc., San Jose, CA (US)

(72) Inventors: Alexander Klimetschek, San Francisco, CA (US); Alexandru Robert Munteanu, Bucharest (RO); Lars Trieloff, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 807 days.

(21) Appl. No.: 14/047,503

(22) Filed: Oct. 7, 2013

(65) Prior Publication Data
US 2015/0100406 A1 Apr. 9, 2015

(51) Int. Cl.
*G06Q 30/02* (2012.01)
(52) U.S. Cl.
CPC ............... *G06Q 30/0242* (2013.01)
(58) Field of Classification Search
USPC .......................................... 705/14.41–14.73
See application file for complete search history.

(56) References Cited

U.S. PATENT DOCUMENTS

| | | | |
|---|---|---|---|
| 2008/0082400 A1* | 4/2008 | Martel et al. | 705/10 |
| 2008/0275980 A1* | 11/2008 | Hansen | G06Q 30/02 709/224 |
| 2011/0119125 A1* | 5/2011 | Javangula et al. | 705/14.43 |
| 2011/0213657 A1* | 9/2011 | O'Malley | G06Q 30/0251 705/14.49 |

* cited by examiner

*Primary Examiner* — Peter H Choi
*Assistant Examiner* — Derek Jessen
(74) *Attorney, Agent, or Firm* — Kilpatrick Townsend & Stockton LLP

(57) ABSTRACT

Systems and methods for editing, testing, and measuring electronic content components are provided. An exemplary method receives an indication of a campaign including instances of a component and targeting rules, the component having events or properties mapped to data elements to be tracked by an analytics service. The component comprises a template for the instances for use in electronic content. The method displays a user interface (UI) including the instances. The UI is configured to receive modifications to the instances, rules, and component. The method provides campaign data including the instances and targeting rules, and the electronic content including the component. The content is configured to send analytics data for exposed events or properties of the component to the analytics service during use of the content. Another embodiment uploads at least a portion of the content to a test environment, and pushes modifications to campaign data to the test environment.

21 Claims, 13 Drawing Sheets

INTEGRATED TESTING, TARGETING AND MEASURING OF WEB SITE COMPONENTS

FIELD

This disclosure relates generally to computer-implemented methods and systems for creating and testing electronic content components and more particularly relates to the creation, testing, modification, targeting, distribution, and measuring of web site components.

BACKGROUND

In order to operate commercial web sites successfully, it is desirable to measure and track the ways visitors interact with the web site, so that metrics such as usability, effectiveness and conversion rate of the web site can be analyzed. Such analytic information can be used in order to take informed actions that change the web site's content, appearance, structure, design and functionality to support the web site operator's business goals. For this process of repeated measurement and improvement, two separate systems are typically employed: a web content management system, and a targeting system. The content, design and functionality of the web site can be provided by a content management system that stores abstract definitions of the web site and its metadata and renders them to visitors of the web site using a system that determines how the content should be rendered. In order to reduce development costs, modern content management systems employ a component approach that allows for variable and flexible templates. Some existing content management systems offer content authors a rich interface for authoring content.

Separate targeting systems exist that can provide targeted content delivery and analytics, which can be used inside certain content management systems. Such use is typically performed by adding extra layers to content management systems, where the extra layers deal with managing content and targeting rules for external systems. In such environments, content authors need to explicitly manage content for two separate systems, namely, a content management system and a content targeting system. Existing content management and targeting systems are external with respect to each other and are not completely integrated, forcing content authors to use multiple applications instead of a unified user interface.

SUMMARY

One exemplary embodiment involves receiving an indication of a campaign including instances of a component and targeting rules, the component having events or properties mapped to corresponding data elements to be tracked by an analytics service. According to this embodiment, each component comprises a template for the instances for use in electronic content. The embodiment displays, in a user interface (UI), visual indications of instances of the component, wherein the UI is configured to receive modifications to the instances, the targeting rules, and the component. Next, the embodiment provides the campaign data and the electronic content, the campaign data including the instances and the targeting rules, and the electronic content including the component. In this embodiment, the electronic content is configured to send analytics data for exposed events or properties of the component to the analytics service during use of the electronic content.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
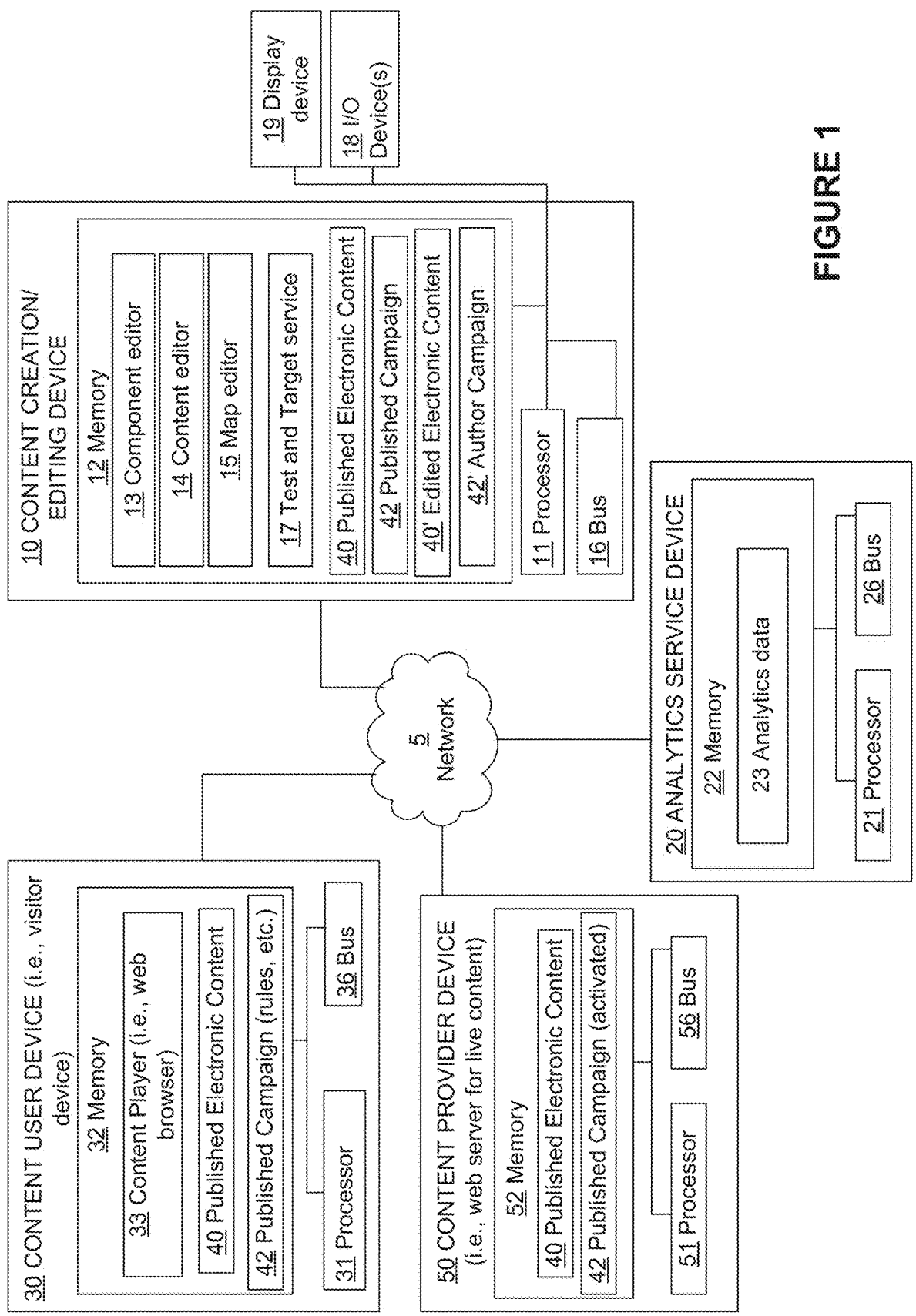
FIG. 1 is a block diagram depicting exemplary computing devices in an exemplary computing environment for implementing certain embodiments.

Computer-implemented systems and methods for testing and targeting a web site component directly in a user interface (UI) of a content management system in a 'what you see is what you get' (WYSIWYG) fashion are disclosed. Such systems and methods may facilitate content authors being able to dynamically switch between and preview different variants of a component, such as, for example, an image banner on a web page, to see it in context with other components of the web page, add new variants for new target audiences, and to change or remove existing components. The systems and methods provide these features in a unified authoring UI so that content authors are not required to leave the authoring UI in order to modify, target, preview, add, and remove components. Embodiments allow every object on a web page to be targeted and can display collected measurements of analytics data in context on the web page so that effectiveness of targeted components can be evaluated and measured.

Embodiments include three main building blocks: a target editor with a content targeting UI; a content synchronization service; and an analytics UI for displaying analytics data. An exemplary content targeting UI is described below with reference to FIG. 2. In embodiments, the content targeting UI can include or be invoked by an authoring UI, such as, for example, the authoring UI shown in FIG. 3. According to embodiments, the targeting and authoring UIs can include or invoke the analytics UI. An exemplary analytics UI is described below with reference to FIG. 4. An exemplary content synchronization service is configured to automatically perform what has traditionally required manual steps and inputs into a form-based interface. The content synchronization service synchronizes content behind the scenes. The synchronization can occur in response to a user action in an authoring UI or content targeting UI. The content synchronization service can be implemented as part of a content management system providing an authoring UI, a staging area for content, and publishing of activated web pages. For example, a content management system such as Adobe® Experience Manager (formerly Adobe® CQ) can maintain two sets of assets for a promotional or marketing campaign: an author campaign; and a published campaign. The author campaign can include edited components of electronic content, changed targeting rules for components, and/or experiences added or modified by an author. The published campaign can be created from an author campaign in response to the author explicitly activating electronic content, such as a web page, to publish it. In an embodiment, a single input or selection, such as a click, can activate (i.e., publish) electronic content, which initiates content synchronization between a content management system and a 'test and target' service. The test and target service is configured to mimic/simulate the author campaign for testing and targeting purposes. This same input can also initiate content synchronization between the content management system the set of components for the corresponding published campaign. For example, if the electronic content is embodied as a web page, in response to receiving input indicating activation of the web page, the web page components and targeting rules for the components are synchronized between the content management system and a test environment so that the test and target service can simulate execution of the web page. Similarly, if a web page is activated, a set of assets including the web page components and targeting rules for the components are synchronized between the content management system and production web server serving the live web page content to web page visitors.

Exemplary embodiments integrate features of a content management system, such as for, example, Adobe® Experience Manager with 'test and target' functionality for testing and targeting electronic content such as web site content and web site components. In one embodiment, the 'test and target' functionality can be embodied as a service to be included in a web site. The test and target functionality can be implemented, for example as a part of Adobe® Target (formerly Adobe® Test and Target) and offered as cloud-based software as part of the Adobe® Marketing Cloud. Embodiments allow every component in a content management system to be targeted using a test and target service. For example, in implementations where the content management system is embodied as Adobe® Experience Manager, all components in Adobe® Experience Manager can be targetable using Adobe® Target.

Certain embodiments can be implemented in a content management system configured to provide integrated testing, targeting and measuring of web site components. For example, the content targeting UI, content synchronization service, and analytics UI described herein can be implemented as part of or invoked by Adobe® Experience Manager. Adobe® Experience Manager can include the exemplary targeting and authoring user interfaces (UIs) described herein as part of a unified UI for a content management platform for providing web content management. Adobe® Experience Manager allows component creation and targeting through the use of the targeting, authoring and analytics UIs described herein and shown in FIGS. 2-4 and 8. Embodiments allow integrated testing, targeting and measuring of web site components within a unified authoring UI implemented in Adobe® Experience Manager.

In one embodiment, instead of using separate interfaces or systems for content management and targeting, web content authors, web developers, and other users can use a single authoring UI which allows them to create, target, and measure web content. Embodiments also provide the ability to separate authoring from publishing, even in cases when a given content targeting system does not explicitly support it. Exemplary embodiments can reuse content and targeting rules without requiring manual entry of information in multiple systems.

An exemplary system includes a target editor with a content targeting UI, a content synchronization service, and an analytics UI configured to display analytics data. The analytics data can be received from a computing device hosting an analytics service, such as, for example, the analytics service device 20 shown in FIG. 1. An exemplary content targeting UI, such as the targeting UI shown in FIG. 2, allows users to take any component which is present in the authoring interface and target it without having to leave the normal web page authoring UI. In one embodiment, the act of targeting a component simply wraps the targeted component inside another component which renders the existing component without any UI changes visible to a user of the component (i.e., a web site visitor). An author can then add any number of variants of that component, i.e., experiences, and select what targeted group of visitors, i.e., an audience, should see a particular variant. An author can define targeting rules inline, by reusing segments already present in the content management system. After the authoring is complete, the experiences can be previewed in at least two modes, namely an explicit mode—by selecting experiences (segments) defined by the author, and an implicit mode—by simulating a local user or visitor profile change (gender, age, and/or other demographic data associated with a visitor profile). In the implicit mode, content can be retrieved from a content management system in response to the profile change. When authoring and previewing is complete, the author can then activate, i.e., publish, the targeted content, including the experiences the author has set up. In this embodiment, experiences are instances or versions of component which the author has set up for different segments or audiences of users. In an embodiment, this is all that an author user typically has to do, and the underlying implementation, including the content synchronization service functionality described below, occurs in the background and is essentially hidden from the author.

An exemplary content synchronization service can perform background synchronization of an author's work once a component of electronic content has been targeted, without requiring manual intervention by the author, a software engineer, a system administrator, or another user. Whenever an author defines images, segments or other content to be targeted, the content synchronization service ensures that content is saved in the content targeting system. The content synchronization service can be configured to synchronize multiple versions of electronic content, such as, for example: an author-specific version corresponding to the changes made when components of the content are created or edited; and a published version corresponding to the live, production version which will be delivered to users of the electronic content. In embodiments where the content is content of a web page, an author-specific version of the web page, replete with edited components, can be previewed by the author. Also, for example, in scenarios where the content is web site content, the published version is presented to users visiting the web site. The content synchronization service allows an author to preview and validate targeting rules for components of the content without affecting the published version of content delivered to users until the rules and content are published.

An exemplary analytics UI provides an in-place display of measurements related to the efficiency of targeted content, such as components of a web page that have been targeted to specific audiences. An exemplary analytics UI is described below with reference to FIG. 4. For each targeting rule, a number of hits and conversions are displayed, as well as marking the most efficient targeting rule as the winner (i.e., the most effective rule). In an embodiment, one measure of efficiency or effectiveness of a rule is represented as a percentage of total impressions (i.e., views or presentations) for a targeted component that result in conversions. As used herein, a "conversion" refers to the success of a specific variant or instance of a component in eliciting a response from a user. For example, in the context of a web page, a targeted component can be embodied as a selectable (i.e., clickable) offer or advertisement. In this example, a conversion refers to the success of that offer or advertisement in eliciting a response from a visitor to the web site. When a web page visitor clicks, selects, or otherwise interacts with the offer or advertisement, that interaction can be deemed a conversion. In embodiments, targeted components of a web page can be selected to navigate to a different web page. When such components are clicked on, the visitor can be presented with the different page, where the components and the different web page are specifically targeted to a segment or class of visitors that the visitor belongs to. This conversion of an offer to view a different page can be tracked and saved as analytics data and subsequently made available to the test and target service 17.

Embodiments disclosed herein provide various advantages over existing systems. Such benefits, as examples, may include providing integrated and easy-to-use user interfaces that allow instrumenting a web site so that web site components can be efficiently created, modified, tested, and targeted to web site visitors. The user interfaces can also be used so that visitor interaction with the web site can be tracked consistently. Electronic content, such as web site components, can be provided to test and live environments in parallel so that effectiveness measures of marketing and promotional campaigns can be simultaneously displayed in both test and live, published environments. Analytics instrumentation can be used in a consistent and efficient manner across one or multiple web sites, web pages, rich Internet applications, or any other electronic content, so that conflicting or incomplete instrumentation can be avoided. Analytics data for live, published electronic content associated with marketing and promotional campaigns can be displayed in a test and targeting environment so that a content author can readily evaluate measurements of effectiveness of targeted components. The time needed to create, target, test and publish components, as well as the time needed to track complex web sites may also be reduced significantly. The tasks of testing and targeting web site components and instrumenting web sites may be performed in an integrated environment. In embodiments involving a unified graphical user interface (GUI), because testing, targeting and measuring of web site components can be done mostly visually in an integrated environment, the level of technical expertise needed, and the reliance on generally overloaded software engineers in large organizations and companies, may be greatly reduced. Also, the process of extracting instrumentation data from a web site, which is made independent of external system technologies, can be separated from the process of packaging and sending that data to an external data collection and processing system. This enables the instrumentation data to be easily reused with other systems for varying purposes (web analytics, A/B multivariate testing, marketing/promotional campaigns, etc.).

Embodiments disclosed herein facilitate analytics-system-independent instrumentation. Instead of using multiple, separate user interfaces and applying external system instrumentation directly to a component or instance of a component, instrumentation of a component may configure instances of the component to generically send extracted data to a set of data stores independent from any external data collection or other analytics system. A mapping of extracted data to external system data requirements can be separately created and used to link the extracted data for analytics. This separation of instrumenting a component from defining the sending of data to the external analytics service allows the component to be instrumented without having to assume knowledge about how the extracted data will be used in the further process.

Embodiments disclosed herein include systems and methods for creating, targeting, testing, and modifying a component of electronic content. The electronic content can include content of a web site, such as web pages. The web pages can in turn comprise components such as images. The images can represent banners, navigation controls, buttons, icons, links, forms, text fields, dialog boxes, and other selectable, actionable web page components. The components can be targeted to a default audience of users or not targeted at all. Multiple variants or instances of a given component can be created using an authoring UI (see, e.g. the authoring UI 302 shown in FIG. 3). These instances can be edited to have different appearances, annotations, and metadata as needed to tailor them to a given marketing or promotional campaign. Instances of a component can be targeted to respective audiences with a targeting UI. The targeting UI can include an experience switcher (see, e.g., experience switcher 204 shown in FIG. 2).

An exemplary target editor is configured to launch a targeting UI in response to a 'ready' event having been set for an authored instance of a component. For example, a targeting UI can be displayed after an editable instance of a component has been created on a client side component editor by an author. That is, creation of an instance of a component in authoring mode can set a ready event for that instance so that the instance is ready to be targeted. Creation or modification of an instance of a component can invoke a target editor. The target editor can be embodied as a function or module that, when called, is executable to target an instance of a component to a certain audience of users. As used herein, the term "target component" refers to any targetable component, including components that are not currently targeted to an audience. Target components can be associated with promotional or marketing campaigns and targeted to an audience of users, such as, but not limited to, web site visitors. In certain embodiments, there are at least three separate modes for a target component: (1) authoring (i.e., authoring component instances/experiences); (2) simulating instances of authored components; and (3) execution of published, activated components. These modes for a target component are explained in the following paragraphs.

Figure 2:
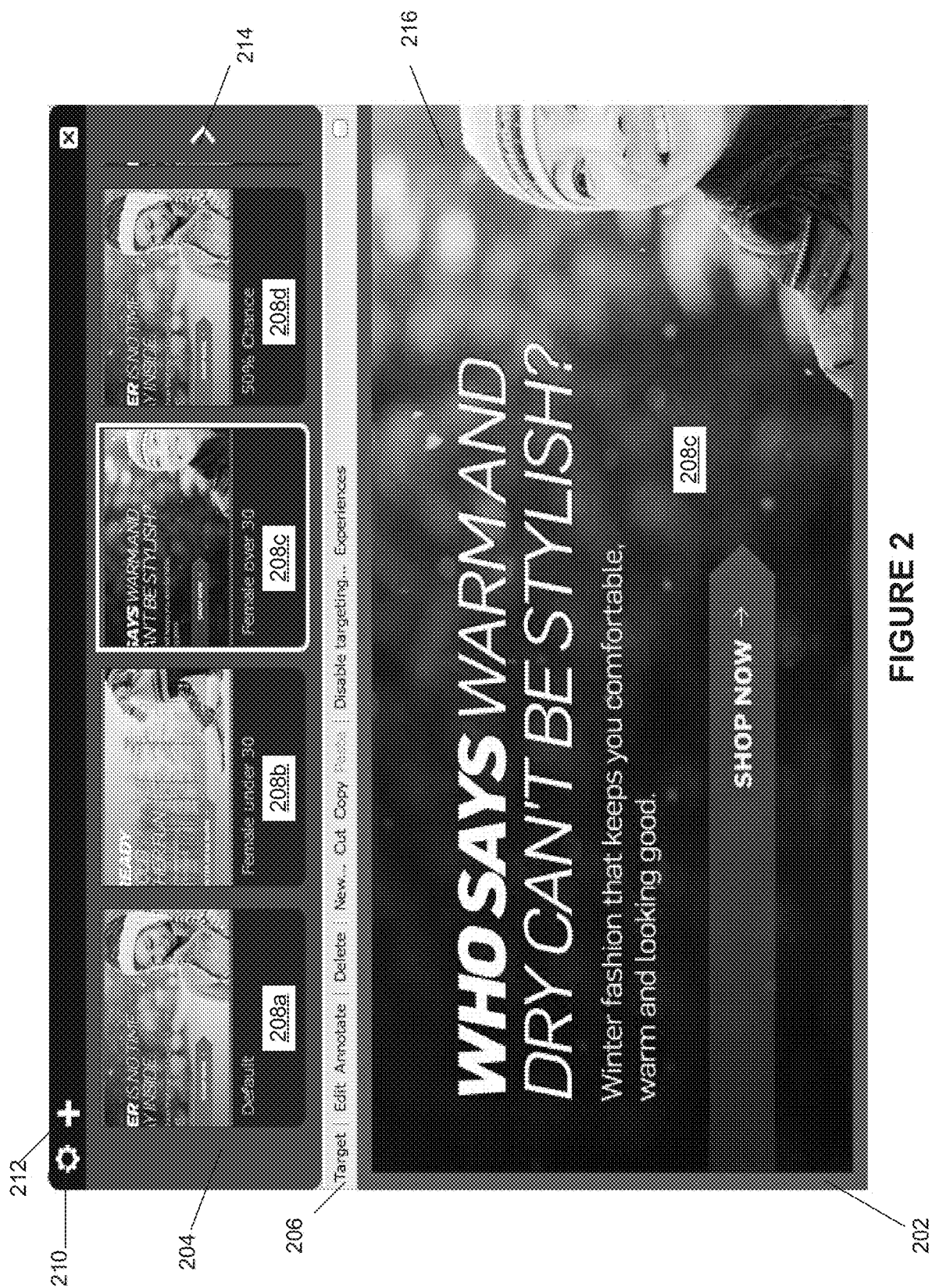
FIG. 2 illustrates an exemplary content targeting user interface (UI), in accordance with embodiments.
Figure 3:
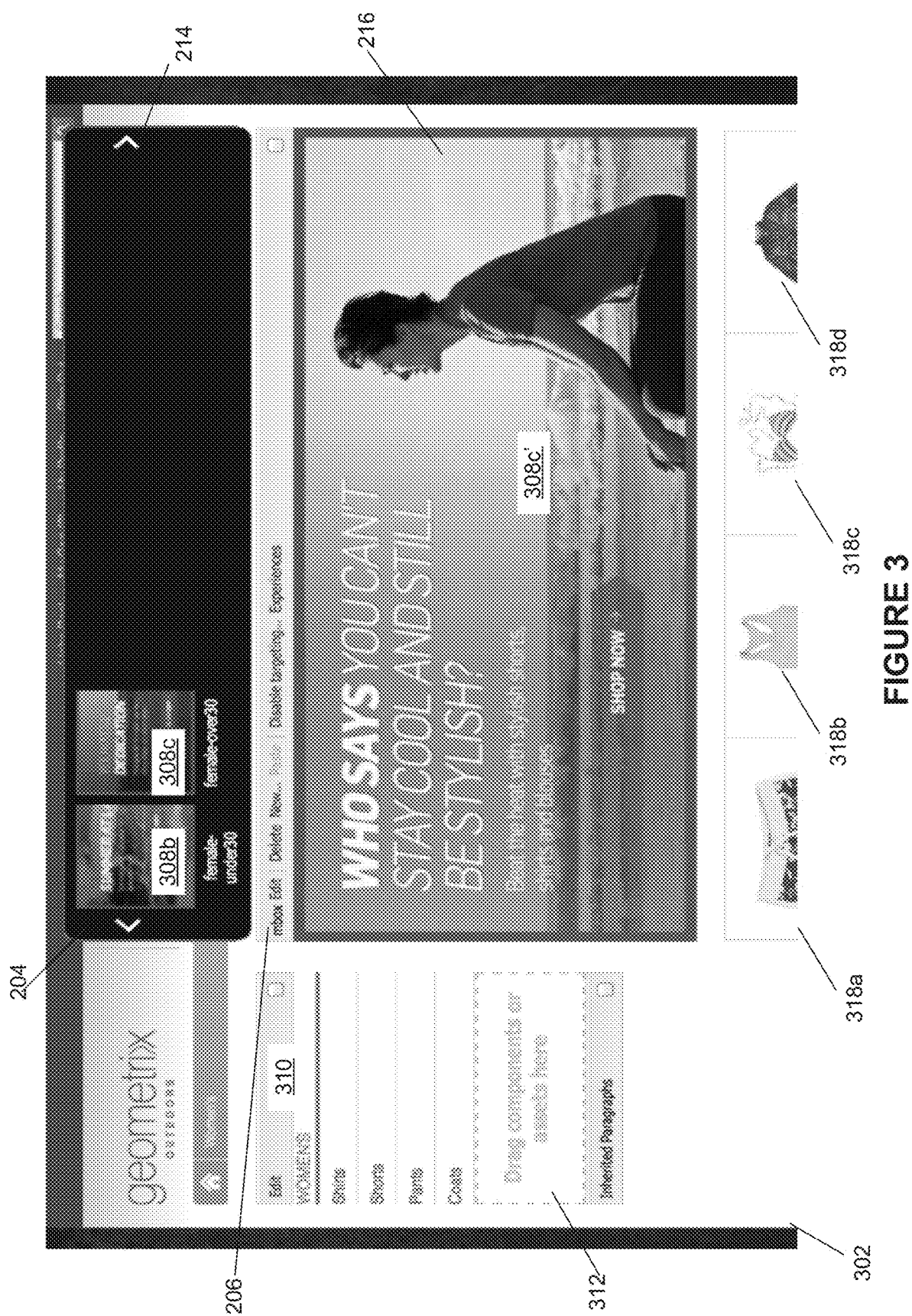
FIG. 3 illustrates an exemplary authoring UI, in accordance with embodiments.

The authoring mode can be activated when an author selects or switches to an experience for a given campaign. A target component can be placed in the authoring mode in response to determining that an experience has been selected. As shown in FIGS. 2 and 3, experiences can be instances 208a-c of a component geared towards audiences. The audiences can be categorized by one or more attributes. The attributes can include demographic attributes, such as, for example, an age and gender of a web site visitor. A default experience can be created for cases where little or no demographic data is available for a web site visitor or other user of electronic content. In certain embodiments, the selected experience for a target component is initially set to a default experience. The default experience can be associated with, mapped to, or stored under each target component directly. According to these embodiments, the initial experience for a newly created instance or variant of a given component is initially set to the default child experience for the component.

According to an embodiment, simulating instances of authored components is performed to render a preview of electronic content, such as a web page. The simulated execution automatically selects authored instances of components and executes the authored instances that correspond to targeting rules for a given user profile. The user profile can be a selected profile of a sample user that is a member of a target audience (i.e., an audience of interest). The simulation can commence when a campaign is set to an 'auto' mode so that authored instances of components for a campaign are automatically selected. For example, if a given campaign is set to auto mode and then a sample user profile is selected, author instances of components of the electronic content for that user profile are displayed in a test environment. In auto mode, the electronic content is displayed as it would be to an actual user having a profile matching the sample user profile.

In embodiments, simulation of an author campaign invokes a test and target service configured to perform testing and targeting operations for the author instances of the components. A difference between simulation of author instances of components and execution of published components is simply the content. For example, author instances can take components and campaign content from the author instance itself, whereas the corresponding published instance uses components from the published content for a live campaign. The simulation and execution modes can be performed the same way using two campaigns with a test and target service. The test and target service can display both the published campaign with live, production components as well as an author campaign with edited components being tested. In execution mode, the test and target service can use the published content for 'normal', live components. In simulation mode, there can be a separate author campaign that gets the latest content for campaign instances. This content can be used when simulating execution of the authored, but not published, content, by a user with a certain profile. In an embodiment, switching from the authoring mode to the simulation mode will actively reload the target component code, such as hypertext markup language (HTML) code, which in turn will reload the code that does testing and targeting of the component. This can be done using an experience switcher function that initially switches from simulation to authoring mode to cause a target editor explicitly reload the correct component code (i.e., HTML) snippet from the correct page inside a campaign and an experience. Content for a campaign can include a 'teaser page' and other components targeted for a certain group of visitors. Embodiments can include two modules configured to load content: an execution engine and a content targeting UI for editing targeted components associated with a campaign. The content targeting UI include an authoring UI. Example content targeting and authoring UIs are shown in FIGS. 2 and 3, respectively.

As used herein, a "component" refers to any template instantiated as one or more instances in electronic content, each instance of the component having common aspects derived from the template. Examples of components include, but are not limited to, a breadcrumbs bar, a download link, an image, a video player, a dialog box, and a search box. For example, an image banner for a web page can be a component. Most (if not all) visual elements in a web page and other electronic content can be implemented as instances, variants, or versions of a component. In certain embodiments, components are items of content for a web page. Components and instances of components can be identified by a reference or pointer, such as, for example, a Uniform Resource Locator (URL). The pointer can identify a code snippet, such as, for example, a JavaScript snippet executable to load content at the identified URL. Components and their instances can be included in a campaign.

As used herein, the term "experience" refers to any variant, instance, or version of a component. Different experiences can be associated with respective instances of a component, such as an image for a web page. Exemplary embodiments allow an author or another authorized user to select what audience should see a particular instance of a component. In this way, an author can select which component versions will be included in electronic content presented to or seen by (i.e., experienced by) certain audiences. For example, as shown in FIGS. 2 and 3, various instances 208a-d (i.e., experiences) of a component can be targeted to different audiences.

As used herein, the term "electronic content" refers to any type of resource or media that can be rendered for display on computing devices. Electronic content can include text or multimedia files, such as images, video, audio, or any combination thereof. Electronic content can also include application software that is designed to perform one or more specific tasks at a computing system or computing device. Computing devices include client and server devices such as, but not limited to, servers, desktop computers, laptop computers, smart phones, video game consoles, smart televisions, tablet computers, portable gaming devices, personal digital assistants (PDAs), etc. Electronic content can be streamed to, replicated to, downloaded by, and/or uploaded from computing devices. Electronic content can include multimedia hosted on web sites, such as Internet web sites, intranet web sites, standard web pages, or mobile web pages specifically formatted for display on mobile computing devices. Electronic content can also include application software developed for computing devices that is designed to perform one or more specific tasks at the computing device.

Electronic content can be in the form of electronic content streamed from a server system to a client computing device. Streaming electronic content can include, for example, audiovisual content provided using a streaming protocol, such as, but not limited to, real time messaging protocol (RTMP), HTTP dynamic streaming (HDS), and HTTP Live Streaming (HLS).

Unless specifically stated differently, a "user" is interchangeably used herein to identify a user account, a human user, or a software agent. Besides a human user who accesses and uses electronic content such as web pages, a software application or agent sometimes accesses electronic content. The systems and methods disclosed herein can target components of electronic content, such as web page components, to users based on profiles of user accounts associated with both human users and software agents. Accordingly, unless specifically stated, the term "user" as used herein does not necessarily pertain to a human being. As used herein, the term "author" refers to any user who creates or modifies electronic content or campaign data. An author can have permissions or privileges to use a targeting UI (see, e.g., targeting UI 202 in FIG. 2) and/or an authoring UI (see, e.g., authoring UI 302 in FIG. 3) in order to create, edit, target, un-target, and delete components of electronic content. An author can create targeting rules For example, an author can create and edit instances of components and target those instances to audiences.

As used herein, the term "audience" refers to any set or segment of past, current, or potential users of electronic content. An audience can be visitors to a web site. As used herein, the term "segment" refers to any class of users of electronic content. For example, a segment can be a class of web site visitors. A class can be defined by a specific set of criteria or attributes. For example, a class of users of electronic content who are English-speaking male over age 30 can be a segment. An audience can comprise a group of users having profiles associated with them. The profiles can include user characteristics based on prior visits to web sites, a current visit to a particular web site, and/or a user identifier (i.e., a user ID). A cookie can be used to identify a user as a member of an audience. Users having at least one common attribute, such as, for example a demographic attribute, can be part of an audience. For example, a segment of users sharing one or more demographic attributes, such as females over age 30, can be included in a 'female-over 30' audience. Audiences can be defined in terms of demographic data such as, for example, nationalities, spoken languages, residence addresses, and/or business addresses associated with users. Audiences can also be based on time-based attributes such as, for example, a time of day electronic content is accessed, a range of dates content is accessed, a day of week of access, a month during which content is accessed, and/or a season during which access occurs. An audience can be an intersection of two or more segments, such as, for example, males under age 30 who access electronic content on a Sunday evening.

Exemplary systems and methods described herein allow selected variants of components, such as web page components, to be targeted to different audiences. For example, when a visitor navigates to a web page containing a targeted component, an embodiment automatically provides segment information about the visitor to the targeted component. Based on the segment information, the component dynamically selects and displays an appropriate instance of itself (i.e., an experience) in accordance with targeting rules. The targeting rules can be defined as part of a campaign. In one embodiment, the segment information can be provided by a client context subsystem. The appropriate instance can be an offer associated with the campaign. In certain embodiments, a user can be included in multiple audiences. For example, a male user between ages 18-30 and an female user younger than age 30 can both be included in an 'under 30' audience.

In cases where a user is a member of multiple audiences, the systems and methods described herein can select one variant of an electronic content item to target to the user. In alternative embodiments, a system can toggle between two or more variants of a component to target the component to users included in multiple audiences. In scenarion where no demographic attributes or cookies are available for a user, embodiments can display a default variant of a web site component to the user. For example, default variants of web site components can be displayed to a user accessing a web site via a browser with cookies disabled, a user who has not previously visited the web site, and/or a user who does not have a user profile. In embodiments, runtime rules can be established for a campaign to identify segments of users to be included in targeted audiences. Segments of interest to a campaign can be selected from a segment database or other repository storing predefined segments. For example, an author can select segments of interest from a segment database storing demographic and time-based segments. One example of a time-based segment is users accessing electronic content between 9 PM and 11 PM. Embodiments allow an author to create and edit segments and audiences as needed so that they are tailored to a specific campaign. For example, an audience for a winter campaign can include users from northern hemisphere countries visiting a web site between December and March, whereas another winter campaign can target users from southern hemisphere countries visiting a web site between June and September. A user can be placed in a segment based on applying heirarchical rules. For example, if a campaign includes components targeted to married females above age 30 with children, runtime rules can be evaluated to first determine if a visitor to a website is a female whose age is greater than 30, and if so, an additional rule can be evaluated to determine if the female visitor is married. In response to determining that the female visitor is married, another rule can then be evaluated to determine if the visitor has children. According to embodiments, runtime rules can also be based on a time of day a web site is accessed, day(s) of the week (i.e., weekdays or a weekend) a site is accessed, a geographic location associated with a web site visitor, and/or current weather conditions at the visitor's geographic location. In additional or alternative embodiments, the rules can be based on a cursor location, focus location, zoom location, or hovering location exhibited by an input device used by a visitor to navigate within a web site.

As used herein, the terms "asset" and "digital asset" are used interchangeably to refer to an item of electronic content or component included in a multimedia object, such an image, a video, text, or an audio file. As used herein, the term "image asset" is used to refer to a digital image included in a multimedia object. One example of an image asset is an image included in a web page requested by a user. As used herein, the term "video asset" is used to refer to a video file included in a multimedia object. As used herein, the term "text asset" is used to refer to text included in a multimedia object. Exemplary components can be embodied as a text asset, an image asset, a video asset, or a combination of text, image, and/or video assets. For example, components viewed by a visitor to a web page can include a text asset, a video asset, and an image asset. In the context of a campaign, alternative versions of an asset are referred to herein as experiences. In embodiments, an experience can include or hold multiple offers. For example, a 'male under 30' experience can include an offer to be placed in a 'home page banner' location in a web site and another offer in a 'contact email image' location of the web site. Further, for example, an offer can be included in a particular experience (i.e., a targeted component) that is selected and displayed to a user in accordance with rules defined by a campaign that the component is included in. According to this example, an offer is not necessarily an experience, as a given experience can hold multiple offers. In certain embodiments, instances of web page components included in a campaign include offers. According to these embodiments, offers are instances of components associated with a campaign. In the context of a web site, offers are instances of a web site component targeted to web site visitors (i.e., shoppers at the web site). Experiences are components instances targeted to segments or audiences of users.

As used herein, the term "metadata" is used to refer to information associated with (and generally but not necessarily stored with) components of electronic content such as web page components. Metadata can include annotations to a component indicating tracking information, i.e., "tracking meta-information." Metadata can include information associated with a variants or instance of a component of electronic content and can provide information about a property of the instance. Metadata may include information uniquely identifying a component or an instance thereof. Such metadata may describe a storage location or other unique identification of a component or an instance of a component. Such metadata can be a reference to a storage location of the component in a server system. One example of such a reference is a URL identifying the storage location on a web server associated with a web site. Metadata for an instance of a targeted component may include an annotation entered, for example, using the annotate button in the editing toolbar 206 shown in FIG. 2. Metadata for an instance of a component can include targeting rules for targeting the instance to an audience. For example, metadata can indicate hierarchical, runtime rules for placing a website visitor or other user of electronic content into a segment applicable to a campaign.

As used herein, a "campaign" refers to a collection of components and rules related to a marketing or promotional effort. For example, a campaign can include a set of rules defining what instances of components should be shown to whom, and when to show the instances. An exemplary campaign can include a plurality of instances of components embodied as a set of alternative assets. Such alternative assets are referred to herein as experiences. In embodiments, for components included in a campaign, all component instances, experiences, and offers are stored in that campaign along with the rules as campaign data. Embodiments enable each offer in a campaign to be associated with a specific segment of users of electronic content. According to these embodiments, when a visitor arrives at a web page containing a targeted component, the component dynamically selects and displays an appropriate offer according to segment information for the visitor in accordance with rules defined for a campaign including the component. A given set of electronic content can include one or more components that could be targeted (i.e., targetable components). In embodiments, multiple campaigns can be applicable to that electronic content. According to these embodiments, each of these campaigns can include respective data for all of the variants of the targetable components (i.e., the experiences) and actual content, referenced for example, in code snippets that belong to those experiences. Campaign rules determine what will be displayed inside electronic content, such as a web page. Campaign data can include logic (i.e., targeting rules) for determining which experiences are to be displayed to certain segments or audiences of users. Campaign data indicates target segments and audiences a campaign is interested in.

A campaign can be time-based. For example, a campaign can be associated with a season (i.e., spring, summer, fall or winter), a range of hours (i.e., 9 AM-6 PM), a date range (i.e., Monday-Friday), or a calendar event such as a holiday. Campaigns can also be geared towards a geographical region, a country, a time zone, or a subset thereof. Campaigns can be developed to promote and sell items during such seasons, time frames, and date ranges in particular regions. FIG. 2 shows component instances 208a-d for an exemplary winter campaign and FIG. 3 shows images 318a-d and component instances 308b, 308c and 308c' for an exemplary summer campaign. It is to be understood that additional time-based campaigns can be created for portions of seasons and events such as Olympic Games, World Cup tournaments, tennis tournaments, and other scheduled events. Campaigns can also be created for different regions and countries to promote and sell certain items and services around the occurrence of regional holidays, national holidays, or other calendar events related to a given region or country.

Embodiments disclosed herein facilitate unified graphical configuration of targeting for electronic content, such as web site components. A graphical user interface can be presented to allow an author or web analyst to inspect what analytic annotations the web site's components are providing (through the metadata provided in the component) and to also see what kind of data is accepted by the web analytics system. Through such a graphical interface, the author or web analyst can select the components that should be targeted and tracked, and select for each trackable interaction and interaction property how it should be tracked in the web analytics system. This mapping associates types of data collected through the system's own instrumentation mechanisms (and stored internally) to types of data that the external data collection system accepts. More specifically, it associates an event or property of the web sites (or other electronic content) with data items (corresponding events or properties) from an analytics system.

These illustrative examples are given to introduce the reader to the general subject matter discussed here and are not intended to limit the scope of the disclosed concepts. The following sections describe various additional embodiments and examples with reference to the drawings in which like numerals indicate like elements.

Exemplary Computing Environment

Referring now to the drawings, FIG. 1 is a block diagram depicting exemplary computing devices in an exemplary computing environment for implementing certain embodiments. Applications edit, display, store, serve and otherwise use web pages and other electronic content on the exemplary computing devices 10, 20, 30, 50. Such applications are shown as functional components or modules. As is known to one of skill in the art, such applications and content may be resident in any suitable computer-readable medium and execute on any suitable processor. As shown, the computing devices 10, 20, 30, 50 respectively comprise a computer-readable medium such as a random access memory (RAM) 12, 22, 32, 52 coupled to a processor 11, 21, 31, 51 configured to execute computer-executable program instructions and/or accesses information stored in the memory 12, 22, 32, 52. Such processors 11, 21, 31, 51 may each comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C #, Visual Basic, Java, Python, Perl, JavaScript, and ActionScript.

Computing devices 10, 20, 30, 50 may also comprise a number of external or internal devices such as a mouse, a CD-ROM, DVD, a keyboard, a display, audio speakers, one or more microphones, or any other input or output devices. For example, device 10 is shown with a display device 19 and various input/output devices 18. The display device 19 can be used, for example to render the user interfaces described below with reference to FIGS. 2-4 and 8. A bus, such as busses 16, 26, 36, 56 is included in the devices 10, 20, 30, 50. Devices 10, 20, 30, 50 could be personal computing devices, mobile devices, web servers, file servers, database servers, or any other type of electronic device appropriate for providing one or more of the features described herein.

Computing devices 10, 20, 30, 50 can include any suitable computing devices for hosting the respective modules shown in FIG. 1. In embodiments, the computing devices 10, 20, 30, 50 are implemented as a single, integrated computing system. In alternative or additional embodiments, one or more of computing devices 10, 20, 30, 50 may be a virtual server implemented using multiple computing systems, clients, or servers connected in a grid or cloud computing topology. As described below with reference to FIG. 9, each of processors 11, 21, 31, 51 may be a single processor in a multi-core/multiprocessor system. Such a system can be configured to operate alone with a single server, or in a cluster of computing devices operating in a cluster or server farm.

The content creation/editing device 10 in FIG. 1 comprises a component editor 13, a content editor 14, a map editor 15, and a test and target service 17 stored in memory 12. These editors 13, 14 and 15 and the test and target service 17 could be part of a single application spread out into individual modules or functions. In alternative embodiments, one or more of editors 13, 14 and 15 and test and target service 17 can be hosted on a separate device. In yet other alternative embodiments, multiple users (i.e., authors) are able to access one or more of editors 13, 14 and 15 and service 17 on one or more computing devices to collaboratively create and edit analytics-enabled electronic content, such as targeted components. In an embodiment, content creation/editing device 10 can host a content management system.

Component editor 13, for example, could be used by a software engineer or an author to create and edit a component. Creating or editing a component could involve the author adding code and/or annotations to expose properties and events of instances of the component for analytics. As a specific example, the author may add one or more declarative statements calling analytics-enabling functions and providing parameters that specify what properties and events are exposed for analytics. Additionally or alternatively, the author may add annotations in metadata of the component identifying the properties and events.

The content editor 14, for example, could be used by a web site developer or author to create one or more web pages using one or more components created using the component editor 13. The web site developer may, in one embodiment, include a specific analytics component for receiving and consolidating analytics messages from instances of analytics-enabled components. In certain embodiments, using analytics-enabled components (and in one embodiment, also including a consolidating component) is all the web site developer needs to do in creating the web site content. This is because another user can provide a mapping that is added to or used by the electronic content to facilitate a link between instances of components that generically provide analytic information and an analytic service collecting device, such as the analytics service device 20.

A visual interface of map editor 15 can be used, for example, by an analyst who may have limited technical sophistication with respect to understanding web site creation code, etc. The analyst may use a graphical user interface (GUI) provided by the map editor 15 to identify which of the exposed properties and events from each of the components will be associated with corresponding data elements of an analytics service. Such a GUI can be displayed on display device 19. Creating such a mapping will result in tracking of the specified properties and events for all (or in one embodiment selected instances) of the component. In circumstances where the mapping applies to all instances, use of the mapping ensures consistent use, application, and management of the analytics.

Map editor 15 can provide inheritance between mappings. Different mapping configurations can establish an inheritance relationship, which facilitates easier management of multiple mapping configurations that share common aspects. Each mapping configuration can have multiple sub-configurations. For each sub-configuration, the web analyst or other user can decide to simply copy (inherit) the super-configuration's component mappings or to override it and provide its own component-specific mappings. Additionally, for sub-configurations it is possible to introduce additional component-specific mappings. Changing the mapping of a component's events and properties will affect all sub-configurations unless the component mapping has not been overridden. This makes it possible to keep a great number of configurations consistent with each other, while allowing some degree of flexibility through customization.

A mapping produced by map editor 15 can be used to automatically add analytics specifics to electronic content. For example, if a web site developer or author has created electronic content 20 on content editor 14, a mapping produced using a map editor may be used to add to or otherwise alter the electronic content to implement the analytic specifics (e.g., for a specific analytics service) according to the specified mapping.

A test and target service 17 can be used to display and execute the edited electronic content 40' created and edited using content creation/editing device 10. For example, the test and target service 17 can simulate execution of edited electronic content 40' and display a preview of the simulated execution on the display device 19. Although the test and target service 17 is depicted as being hosted on the content editing/creation device 10 in FIG. 1, it is to be understood that in alternative embodiments, the test and target service 17 can be external to the content editing/creation device 10. For example, the test and target service 17 can be a separate entity executing on another computing device communicatively coupled to the content editing/creation device 10 via network 5 (see, e.g., the test and target entity 617 in FIG. 6).

As shown in FIG. 1, the content creation/editing device 10 can store edited electronic content 40' and an author campaign 42'. The author campaign 42' can include a modified set of assets for a campaign being tested by the test and target service 17. In cases where the edited electronic content 40' includes web page content edited using content editor 14 and/or web page components edited using component editor 13, the edited electronic content 40' includes the edited web page content and components. An author campaign 42' corresponding such edited electronic content 40' with web page components can include modified targeting rules and/or edited web page component instances (i.e., offers or experiences). The published electronic content 40 includes activated content replicated to a live content provider device. This activated content can include content for a live, published campaign. Upon activation of edited electronic content 40' at the content creation/editing device 10, a copy of the content is saved as published electronic content 40 and then replicated from the content creation/editing device 10 to a content provider device 50 via network 5. Similarly, when an author campaign 42' is activated on the content creation/editing device 10, a copy of the campaign data, including targeting rules and component instances, is saved as the published campaign 42 and then pushed to the content provider device 50 via network 5. Network 5 may be a data communications network such as the Internet. In embodiments, network 5 can be one or a combination of networks, such as the Internet, a Wide Area Network (WAN), WiFi, a Local Area Network (LAN), or any other wired or wireless network.

Although a single content provider device 50 is depicted in FIG. 1, it is to be understood that in alternative embodiments, the published electronic content 40 can be replicated to a plurality of content provider devices. In embodiments where the published electronic content 40 is content of a web page, the published electronic content 40 can be replicated from the content creation/editing device 10 to a web server, such as content provider device 50, serving the web page content to web page visitors. Such replication can be performed by a content synchronization service via network 5. The content synchronization service can also push at least a portion of the published electronic content 40 to the test and target service 17 so that an author can test and evaluate targeted components included in a published campaign. In this way, a published, live campaign is simultaneously available in a content player 33 of a content user device 30 of the published electronic content 40 and an author. In additional or alternative embodiments, the content provider device 50 can be embodied as a file server, database server, or cloud-based storage device configured to host a copy of the published electronic content 40 and provide the published content 40 to users.

A visual interface of the test and target service 17 can be used, for example, by an author who wishes to test targeted components included in edited electronic content 40'. The author may use a graphical user interface (GUI) provided by the test and target service 17 to present live previews of edited electronic content 40' for an author campaign as well as published electronic content 40 of a live campaign. The GUI of the test and target service 17 can also include an analytics user interface so that effectiveness of targeted components can be measured. Such a GUI can be displayed on display device 19 and can include the exemplary user interfaces shown in FIGS. 2-4.

The content user device 30 shown in FIG. 1 can be used to access and display the published electronic content 40 created, edited and published using content creation/editing device 10. A web site visitor or other user can execute a content player 33 of the content user device 30 to display, play or otherwise use the published electronic content 40. The content user device 30 can be any computing device capable of executing a content player 33 suitable for accessing and rendering the published electronic content 40. For example, the content user device 30 can be a desktop computer, a laptop computer, a smart phone, a video game console, a smart television, a tablet computer, a portable gaming device, a personal digital assistant (PDA). As shown in FIG. 1, the content player 33 can be embodied as an Internet browser configured to render and use web site content included in the published electronic content 40. For example, when the published electronic content 40 includes a web page and a visitor uses the content player 33 to view the web page, the content user device 30 can automatically provide segment information about the visitor to a targeted component in the web page. Based on the segment information and runtime targeting rules, an appropriate instance of the component is dynamically selected and displayed. The runtime targeting rules in this example are defined by the live, published campaign. In one embodiment, segment information for users of the content user device 30 can be provided by a client context subsystem. As shown, the content user device 30 can be a visitor device communicatively coupled with content creation/editing device 10 and the analytics service device 20 via a network 5. For example, content user device 30 can receive published electronic content 40 from content creation/editing device 10 via network 5 and components of the published electronic content 40 can provide analytic information to the analytics service device 20 via network 5.

The analytics service device 20 shown in FIG. 1 can be used to collect analytics data 23 received via network 5. The analytics data 23 can include measurements related to the effectiveness of targeted content, such as components of a web page that have been targeted to specific audiences. The analytics data 23 can include, for each targeted component, a number of impressions, hits, and conversions. In an embodiment, a running total of impressions (i.e., views or presentations) for a targeted component as well as conversions for the component can be included in the analytics data 23. Impressions, conversions, and other user actions related to targeted components of the published electronic content 40 can be tracked and saved as analytics data 23 by the analytics service device 20. For example, the analytics service device 20 can receive indications of user interactions with targeted components from the content user device 30 via the network 5, and then save those tracked actions as analytics data 23. The analytics data 23 can be subsequently made available to the test and target service 17 via the network 5.

Exemplary Targeting, Authoring, and Analytics Interfaces

Figure 4:
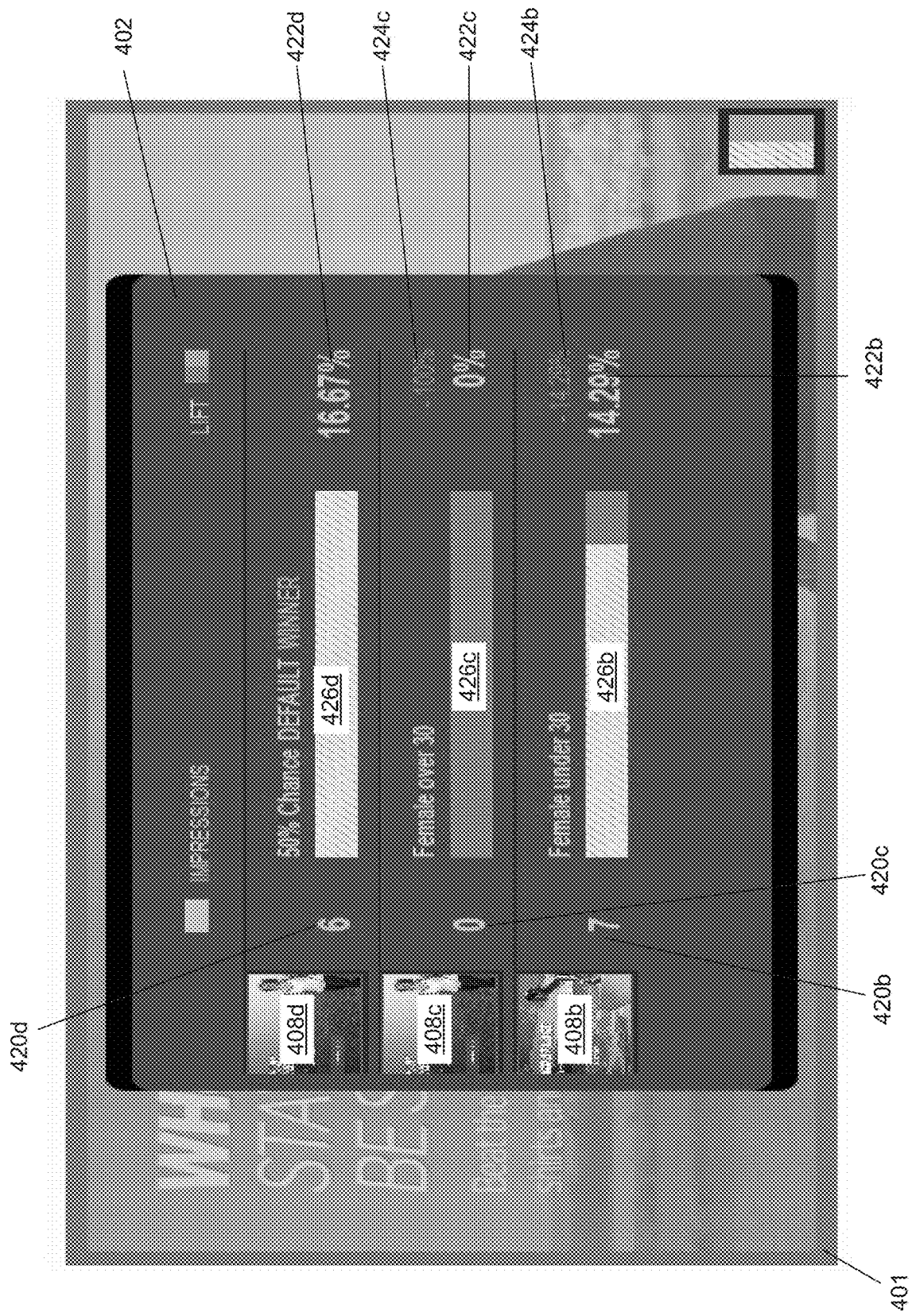
FIG. 4 illustrates an exemplary analytics UI, in accordance with embodiments.

FIGS. 2-4 depict a content targeting, content authoring, and an analytics user interfaces. The user interfaces (UIs) depicted in FIGS. 2-4 are described with reference to the embodiment of FIG. 1. However, the UIs are not limited to that example embodiment. In one embodiment, the UIs are displayed on the content creation/editing device 10 using display device 19. In additional or alternative embodiments, the UIs can be displayed on display devices of other computing devices, such as client computing devices connected to the content creation/editing device 10 and the analytics service device 30 via network 5. For ease of explanation, the content targeting and authoring operations discussed in FIGS. 2 and 3 are in the context of a client application executing component editor 13, content editor 14, and test and target service 17 on a computing device with a display device 19. However, the content targeting and authoring operations are not intended to be limited to the exemplary devices and platforms shown in FIG. 1. It is to be understood that the user interfaces illustrated in the exemplary embodiments of FIGS. 2-4 can be readily adapted to execute on displays of a variety of computing device platforms running a variety of operating systems that support an interactive user interface.

Throughout FIGS. 2-4, displays are shown with various icons, buttons, links, command regions, dialog boxes, windows, toolbars, menus, and lists that are used to initiate action, invoke routines, target content, edit components, view analytics data, or invoke other functionality. The initiated actions include, but are not limited to, selecting an asset or image for a component, targeting a component, creating a new component, editing a component, viewing analytics data for a component, and other component targeting, authoring and measuring actions. For brevity, only the differences occurring within the figures, as compared to previous or subsequent ones of the figures, are described below.

The interfaces depicted in FIGS. 2-4 can be used by an author to create, test, modify, and measure a targeted component. An existing component in a campaign can be selected and modified using the targeting UI 202 of FIG. 2. Different instances of the component can be selected and targeted using the experience switcher 204 shown in FIG. 2. The exemplary targeting UI 202 can be launched in response to determining that a 'ready' event has been set. In one embodiment, the component editor 13 on the content creation/editing device 10 can render the targeting UI 202 upon determining a targetable component has been created. New targetable components can be created on the content creation/editing device 10 in authoring mode using the component editor 13. The component editor 13 can include the targeting UI 202 of FIG. 2 and the authoring UI 302 of FIG. 3. In one embodiment, the authoring UI is launched by selecting an add content icon 212 in the targeting UI 202. New components can be created in an authoring interface included as part of the targeting UI 202 or using the exemplary authoring UI 302 of FIG. 3. The authoring UI 302 can be invoked by the component editor 13 or the content editor 14. Creation of a new component or instance of a component sets a 'ready' mode, which causes a target editor to be invoked. In embodiments, the target editor can be implemented as one or more functions or modules comprising the test and target service 17 shown in FIG. 1. The targeting UI 202 can be the interface for the target editor. According to embodiments, there are at least three separate modes for a targetable component: (1) authoring mode (i.e., authoring instances/experiences); (2) simulating mode (i.e., simulating an author campaign 42' by executing instances targeted to a sample user profile); and (3) execution mode (i.e., executing rules and displaying instances in published campaign 42). The authoring mode can be entered when using the component editor 13 and/or the content editor 14 to create or edit components and content for a campaign. The authoring mode can be activated when an author selects a campaign from amongst a set of defined campaigns stored in a data store. This selection can be made via a UI such as UI 202 or 302 using a 'campaign store widget' on a client computing device being used as a content creation/editing device 10. In this client context with UI 202 or UI 302, campaign selection can be performed using the following example code:

```
var campaignStore = ClientContext.get("campaign");
if (campaignStore && campaignStore.isCampaignSelected( )) {
    // authoring mode (authoring experiences mode)
}
```

As shown in the above code example, in response to determining that a campaign has been selected, the authoring mode (i.e., authoring experiences mode) is activated. In the authoring mode, new experience can be created and existing experiences can be edited. With reference to the example embodiment of FIG. 2, for each component, at least one default instance 208a is selected as an experience. This default experience can be stored directly under its 'parent' component as a default child experience for that component. In an embodiment, a default instance or experience is not specifically targeted to any audience.

According to an embodiment, the simulating and execution modes can both be entered when a campaign is set to 'auto' (i.e., automatically selected). In these simulating and execution modes, a test and target operation commences. The test and target operation can be performed by the test and target service 17. The test and target service 17 allows for simultaneous, live previewing of the edited electronic content 40' and the published electronic content 40. In an embodiment, the only difference between simulation of author component instances included in edited electronic content 40' and execution of published component instances in published electronic content 40 is differences between the published and edited content. For example, a simulation of edited electronic content 40' for an author campaign will present author instances and other content included in the author campaign, and execution of published electronic content 40 uses published instances of components included in an activated, published campaign. Dual presentations of two campaigns can be performed the test and target service 17 that executes published electronic content 40 as the 'normal' campaign while simultaneously offering a simulation of a separate author campaign. The test and target service 17 simulates the author campaign by retrieving the latest author content for the edited electronic content 40', including components and instances created and edited in the authoring UI 302 and the targeting UI 202. This author content is then used to simulate the author campaign by executing the edited electronic content 40'. In one embodiment, an author can switch from authoring to simulation mode in order to test the edited electronic content 40'. This switch will cause the test and target service 17 to actively reload code for each target component included in the edited electronic content 40'. When the edited electronic content 40' includes targeted web page components, HTML code for such components can be reloaded by the test and target service 17 as part of executing the edited electronic content 40'. In one embodiment, a target editor can call a switch experience function as execution of a targeted web page component commences. This function call causes, which can occur as a result of switching from authoring mode to simulation mode, can cause the target editor to explicitly reload the latest/current HTML code for an instance of a web page component. For example, an HTML code snippet for a specific instance of a web page component can be reloaded from an author teaser page included in an author campaign. This can be done as a refresh operation while in authoring mode. In embodiments, there are two places that load content to be simulated or executed: an execution engine of test and target service 17; and within the targeting UI 202. When the edited electronic content 40' and published electronic content 40 includes web page content, Uniform Resource Locators (URLs) can be used for loading the web page content. An exemplary function for loading content is a getofferURL function invoked by the switchExperience module of the target editor, where the getofferURL is called with the URL of a specific instance/experience whose HTML code is to be loaded. Code for a default instance 208a of a component can represented using: <component-instance-path>.default.html. The code for such a default instance 208a can be stored in a content repository of a content management system.

In certain embodiments, content for a campaign can be stored in content repository o a content management system. Embodiments use an application programming interface (API) to access the content repository. In one embodiment, the content repository can be accessed via the Content Repository API for Java (JCR) specification. As used herein, the terms "JCR repository" and "JCR" are used interchangeably to refer to a content repository that is compliant with the JCR specification. In embodiments, a JCR repository is compliant with a specification developed under the Java Community Process via a Java Specification Request (JSR). In certain embodiments, a JCR repository compliant with the JSR-170 specification can be used as a content repository for content of a campaign, including web page components, targeting rules, and metadata. An exemplary JCR repository can be implemented as an object database including a tree of nodes having associated properties. One example of a JCR repository is the Adobe® Content Repository Extreme (CRX) Enterprise Content Management (ECM) platform. The JCR repository can be implemented within a composite content applications platform configured to natively manage content in the JCR repository. The JCR repository can include a web application framework based on Representational State Transfer (REST) principles (i.e., a RESTful web application framework). Another exemplary JCR repository is the Apache Jackrabbit content repository for Java platforms. According to embodiments, as campaigns, their components, and their targeting rules are created, they can be added to the content repository.

For example, if the edited electronic content 40' and the published electronic content 40 includes content for a Java platform, the content can be stored in a JCR repository. In this example, the code for the default instance 208a can be loaded from a JCR repository location such as /content/page/jcr:content/par/target.default.html. Code for another experience, such as the teaser page shown in instance 208c, can also be loaded from another location in the JCR repository, such as, for example: <teaser-page>/jcr:content/par.html. Also, for example, content of a specific campaign, such as the English-language summer campaign content shown in FIG. 3 as instances 308b-c and images 318a-d, can be loaded from a location in the JCR repository, such as /content/campaigns/summersports/female/en-banner/jcr:content/par.html.

FIG. 2 illustrates an exemplary content targeting user interface (UI). In particular, FIG. 2 shows a targeting UI 202 with an experience switcher 204, an editing toolbar 206, and a preview window 216. As shown, the preview window 216 can display a selected instance 208c of a component. The targeting UI 202 can be used to configure targeting rules for the selected instance 208c so that it is targeted for a segment of visitors (i.e., an audience). In FIG. 2, the component instance 208c is targeted to an audience of females over the age of 30. The instance 208c can be displayed in the preview window 216 after being selected from a plurality of instances 208a-d shown in the experience switcher 204.

The targeting UI 202 enables an author to include a component in electronic content such that different instances 208a-d of the components are dynamically displayed to different users of the electronic content based on information known about the users. For example, if the electronic content includes a web page, targeting UI 202, in conjunction with an authoring UI, such as the authoring UI 302 shown in FIG. 3, can allow an author or another authorized user to include components on the web page that dynamically display different images, prompts, buttons, links, or other web page content to different visitors to the web page based on information known about the visitors. The information can be gleaned from cookies, user profiles, or other sources. One source of visitor information can be, for example, the content player 33 executing on the content user device 30 described above with reference to FIG. 1.

Targeting UI 202 can be used to target an instance of any component included in a campaign to an audience. This can be accomplished by configuring a component for a given campaign to display a particular instance 208a-d to a particular audience. For example, as shown in FIG. 2, a web page image component can be configured so that instance 208c of the component is displayed to web page visitors who are females under 30. In this embodiment, when a visitor arrives at a web page containing the targeted component, the client context system automatically provides segment information about the visitor to the targeted component. Based on this segment information, the component dynamically selects and displays an appropriate instance (i.e., an experience or offer) in accordance with rules defined by a campaign that includes the component.

In the example of FIG. 2, the experience switcher 204 is overlaid over a portion of the top of the targeting UI 202. As shown, the experience switcher 204 can be implemented as an overlay bar displaying image thumbnails of instances 208a, 208b, 208c and 208d of components (i.e., experiences). Each of the instances 208a, 208b, 208c and 208d can be associated with different audiences. The experience switcher 204 can be displayed within the targeting UI 202 in response to an author selecting the experiences button in the editing toolbar 206. The experience switcher 204 can be used to select one of the instances 208a-d. Alternatively or additionally, a list of available variants or instances of components can be displayed in response to selection of the experiences button in editing toolbar 206.

The targeting UI 202 includes an add content icon 212, which is shown as a plus '+' sign in the example of FIG. 2. By selecting add content icon 212, an author can add any number of variants or instances of a component. Once added, these new instances, i.e., experiences, can subsequently be selected via experience switcher 204 based on what audience should see a particular instance. A navigation control 214 can be used browse available instances and select a default instance 208a in cases where demographic data about a visitor is not readily available, such as when visitors lack profiles or access content using via browser sessions where cookies are disabled. In one embodiment, the default instance 208a of a component is initially set for new components. According to embodiments, the default instance 208a (i.e., default experience) of a component can be directly associated with, mapped to, or stored under its corresponding target component. For example, the default instance 208a can be the default child experience for a parent target component. An author can select and configure a particular instance 208b, 208c, 208d to be presented to a particular audience. For example, an author or another authorized user can use the targeting UI 202 to configure instances 208b-d to be targeted to different groups of visitors. As shown in FIG. 2, instance 208b can be targeted to females younger than 30, another instance 208c can target females older than 30, and a '50% chance' instance 208d can be configured to handle cases where a visitor is a member of two groups or audiences. In one embodiment, the 50% chance instance 208d includes targeting logic that toggles between two other instances of a component. According to embodiments, percentile instances, like the 50% chance instance 208*d* are used to display multiple instances in a round-robin fashion. For example, having a default experience/default instance 208*a* and a 50% chance instance 208*d* experience means that each of the instances 208*a* and 208*d* will match and be presented to a user 50% of the time. In the example of FIG. 2, the result is that if no personalized instance targeted to a specific segment, such as instances 208*b* and 208*c* matches a user profile, then the default instance 208*a* is shown 50% of the time and the 50% chance instance 208*d* is shown 50% of the time. In another embodiment, the 50% chance instance 208*d* differs from the default instance 208*a* in that instance 208*d* can dynamically cause content to toggle or alternate between two other instances, whereas the default instance 208*a* displays fixed content. According to this embodiment, the two other instances related to the 50% chance instance 208*d* are instances that are targeted to one of two audiences a given visitor is a member of. If a given target component only has a default instance 208*a*, then each visitor will always see content of the default instance 208*a*. This may be the case for new components that an author has yet to configure audience-specific instances for. The 50% chance instance 208*d* can cycle or toggle between two other instances, where the two other instances are both applicable to a user. For example, if visitor information in a cookie or elsewhere indicates that a web page visitor may be in two audiences, such as females younger than 30 without children, and females younger than 30 with children, the 50% chance instance 208*d* can be used to alternate between presenting such a visitor with instances geared for each of the two audiences. This toggling or cycling using the 50% chance instance 208*d* can result in presenting offers to visitors that are more relevant or applicable than an offer represented in the default instance 208*a*.

The experience switcher 204 can be used look for other instances of components to use by selecting the navigation control 214 to scroll through available instances. As shown, the navigation control 214 can be used to navigate to instances with images tailored to different audiences. The targeting UI 202 also includes a content settings icon 210, which is depicted as a gear in the example of FIG. 2. By selecting the content settings icon 210, an author or another authorized user can adjust settings of selected content, such as a selected instance (i.e., an experience). The targeting UI 202 also includes an add content icon 212. In response to receiving a selection of the add content icon 212, a content finder can be launched. According to an embodiment, when looking for other content or components, such as images (see, e.g., images 318*a*-*d* in FIG. 3), an author does not need to know where the content is stored in order to use it. According to embodiments, components such as images and other content can be stored in cloud-based data repository and/or hosted in a network accessible server farm.

By selecting buttons within the editing toolbar 206, a user can modify content for an author campaign and perform targeting related functions for components. As shown, editing toolbar 206 includes buttons to target, edit, annotate, delete, create new, cut, copy, paste, and disable targeting for a selected instance 208*c* of a component. By selecting one or more of the target, edit, annotate, delete, create new, cut, copy, paste, and disable targeting buttons in editing toolbar 206, the selected action(s) can be performed on an instance 208*c* of a component currently displayed in preview window 216. The editing toolbar 206 can be implemented as a context-specific toolbar with certain buttons disabled depending on the context or state of a component displayed in preview window 216. For example, as shown in FIG. 2, the paste button can be disabled and greyed out when nothing has been cut or copied into a clipboard for pasting. In an embodiment, the target button can be disabled if a selected component has already been targeted. Similarly, the disable targeting button can be deactivated if targeting has already been turned off for a selected component. For example, in response to receiving a selection (i.e., a click or touch input) of the target button, targeting is turned on for a selected component. When the disable targeting button is selected, targeted for a component is turned off. Authors may wish to temporarily turn off or disable targeting for components in some cases, such as testing. Selection of the disable targeting button un-targets a component and removes all targeting information from it without removing the targeting information from an associated campaign stored either locally or in the test and target service.

In an embodiment, selection of the target button causes a targeting dialog box (not shown) to be displayed so that an author can set targeting parameters. Targeting parameters are the criteria that will decide which experience or instance will be presented for a given targeted component. In certain embodiments, targeting parameters can be set manually for each targeted component or a test and target framework can be used to define the parameters. A test and target framework can be defined using the test and target service 17 described above with reference to FIG. 1. In accordance with embodiments, certain functionality of the editing toolbar 206 can be invoked without using the toolbar. According to these embodiments, an author can right-click within a component displayed in the preview window 216 to cause a context based popup menu (not shown) to be displayed. For example, an author can change an existing component into a targeted component by right-clicking on the component as it is displayed in the preview window 216 and selecting a target button or link from a context based popup menu including links or buttons for functions that can be performed on the component.

With continued reference to FIG. 2, by selecting the experiences button in editing toolbar 206, a list of other available instances (i.e., experiences) can be displayed for selection. The editing toolbar 206 includes buttons for performing targeting related functions for a selected component. For example, in response to receiving a selection of the edit, annotate, new, cut, copy or paste buttons in the editing toolbar 206, respective dialog boxes for editing, annotating, adding, copying, cutting, or pasting targeting rules or other targeting properties for the component instance 208*c* can be displayed. In additional or alternative embodiments, depending on the context or state of the instance 208*c* displayed in the preview window 216 selecting the edit, annotate, new, cut, copy or paste buttons in the editing toolbar 206 can cause an authoring UI to be launched. The authoring UI can be included as part of the targeting UI 202. One example of an authoring UI is described below with reference to FIG. 3.

By selecting the target button in the editing toolbar 206, a user can target selected content currently displayed in the preview window 216. By repeatedly selecting the target button for multiple components in a web page, an author can target multiple components/objects on the page. These components can be targeted for different groups of visitors. When a visitor comes to a web site for the first time, a call can be made to a targeting server to determine what type of visitor they are, and then lock that visitor into a type/group by setting a cookie. For example, a fixed cookie can ensure that the visitor stays in same group. By selecting the disable targeting button in the editing toolbar 206, targeting for previously targeted content displayed in the preview window 216 is toggled off (i.e., disabled). When targeting is disabled for a given instance, it becomes functionally equivalent to the default instance 208a. This is because like the default instance 208a, an experience whose targeting has been disabled will not have any active targeting rules directed to a specific audience. In an embodiment, when targeting is disabled for an instance, its previously established targeting rules remain in place and are merely deactivated. The delete button in the editing toolbar 206 can be used to delete targeting information and rules. For example, in response to receiving a selection of the delete button, a selected targeting rule for content displayed in the preview window 216 can be deleted.

As discussed above, campaigns can be based on time frames, such as, but not limited to, seasons and date ranges. For example, FIG. 2 shows component instances 208a-d for a winter campaign. Also, for example, FIG. 3 shows instances 308b, 308c and 308c' for a summer campaign.

As shown in FIG. 3, the authoring UI 302 can allow an author to select an instance 308b or 308c from experience switcher 204 and edit a selected instance 308c (i.e., an experience) to create an edited instance 308c' for a summer-related campaign for a given visitor type (i.e., an audience). The targeted audience for instances 308c and 308c' consists of females over age 30, and both instances 308c and 308c' are included in a summer-oriented campaign. FIG. 3 shows how the authoring UI 302 can be used to modify a selected instance 308c to create an edited instance 308c' for a given campaign. In particular, the authoring UI 302 can be used to change an image for the selected instance 308c and save the change in a modified instance 308c'. In this example, the original instance 308c and the edited instance 308c' are experiences or offers targeted to females over 30.

FIG. 3 depicts how the exemplary authoring UI 302 can be used to create new experiences and change an existing experience 308c selected in the experience switcher 204. In particular, FIG. 3 illustrates an authoring UI 302 including an edit pane 310. The edit pane 310 can be used to find and select content, such as images 318a-d and other assets that can be used to create and edit experiences. The edit pane 310 can be used to find content related to a segment or audience. In the example of FIG. 3, the edit pane 310 displays a list of women's clothing items based on the selected instance 308c being targeted to a 'female-over 30' audience. As shown, the current image or asset for instance 308c is displayed as a thumbnail in the experience switcher 204 and a newly-selected image for an edited instance 308c' can be previewed in window 216. By interacting, using an input device, with the authoring UI 302, an author can drag and drop a new asset found via the edit pane 310 to a component window 312 to add the new asset to the instance 308c to create the edited instance 308c'. For example, an author can find an image 318a related to women's shorts and drag that image 318a to component window 312 to add the image 318a to the instance 308c. As seen in FIG. 3, the component window 312 includes a check box to optionally display and select inherited properties of a selected asset.

The authoring UI 302 can be used for component authoring as an interface for the component editor 13 of FIG. 1. Component authoring can involve creating or opening a component, instrumenting the component by sending tracking data to an internal system store, and annotating the component with tracking metadata by selecting the annotate button in the editing toolbar 206. Instrumenting the component may involve examining data that the component stores or processes and identifying the data that may be of interest for analysis/processing (tracking data) by other (sub)systems, whether internal or external, such as an analytics service running on an analytics service device 20. Instrumenting the component allows the component to expose tracking data for consumption within the system or systems that incorporate the component (or instances 308b, 308c, 308c'). Data may be exposed in a uniform way so that any other internal subsystem may readily access it. For example, this may be achieved by sending tracking data to JavaScript key-value stores, grouped under a particular subsystem that resides in a browser (see, e.g., content player 33 in FIG. 1) and stores data such as browser info, visitor profile, current page data, etc.

FIG. 4 shows an exemplary analytics UI 402 for measuring web site components. In particular, FIG. 4 shows how campaign targeting can be visualized on a web page 401 without having to invoke or use a separate test and target UI. For example, in targeting UI 202 or authoring UI 302, an author can switch to an analytics mode in order to launch the analytics UI 402 shown in FIG. 4. The analytics UI 402 can be rendered as an in-place overlay or popup on a web page 401. The analytics information presented in the analytics UI 402 provides measures of experiences (i.e., instances 408b-d) and targeting. The analytics information can include statistics and metrics gleaned from the analytics data 23 collected by the analytics service device 20. Statistics and metrics for all visitors can be displayed in place, and aggregated into different segments or audiences of visitors.

As seen in FIG. 4, the exemplary analytics UI 402 can display respective impressions 420b-d for each targeted component instance 408b, 408c, and 408d. The analytics UI 402 also displays graphs 426b-d of metrics and statistics for instances 420b-d (i.e., different experiences). The analytics UI 402 can display respective numbers of impressions 420b-d for component instances 408b-d and respective conversion rates 408b-d based on the respective conversions by visitors divided by the impressions 420b-d. In the context of the analytics UI 402, the conversion rates 422b-d indicate a relative measure of effectiveness or success of each of the instances 408b-d in eliciting a response from a visitor. For example, a conversion rate can represent click-through rate of users calculated as a percentage of users clicking on or selecting an instance divided by the total number of impressions (i.e., presentations or views) of that instance. By using the analytics UI 402, an author can readily determine that a particular offer is the most effective, 'winner' offer, based on its conversion rate being higher than conversion rates exhibited by other offers. In the non-limiting example of FIG. 4, the 50% chance instance 408d is the winner instance based on its conversion rate 422d being higher than conversion rates 422b and 422c of instances 408b and 408c, respectively. In the embodiment shown in FIG. 4, the conversion rates 422b-d are percentages of impressions 420b-d that led to conversions. That is, the conversion rates 422b-d represent the respective percentages computed as a number of times a visitor clicked on an ad or offer in respective ones of the instances 408b-d divided by the corresponding impressions 420b-d.

FIG. 4 shows results of measured analytics data for component instances 408b-d. In particular, instance 408b, which is targeted to females under 30, has resulted in one conversion (i.e., one click or selection) out of seven impressions, which equates to a conversion rate 422b of 14.29%. As shown, when an offer, such as component instance 408c, has not had any impressions, its conversion rate 422c will be 0%. In the example of FIG. 4, instance 408c, which is targeted to females over 30, has no impressions 420c. This can occur in cases where no users in the target audience have visited a web page. The 50% chance instance 408d has a conversion rate 422d of 16.67%. In other words, instance 408d has netted one conversion out of six total impressions 420d.

As shown in FIG. 4, lift rates 424b and 424c indicate percentage improvements/increases or declines/decreases in conversion rates for instances 408b and 408c, respectively, as compared to a baseline conversion rate. A negative lift rate, such as the −14.29% lift rate 424b, indicates that the corresponding component instance (e.g., instance 408b), has a conversion rate that is lower than a baseline conversion rate. The negative 14.29% lift rate 424b indicates that instance 408b is poorly targeted. That is, instance 408b has elicited 14.29% less conversions from its targeted audience of females under 30 than a baseline conversion rate. An instance such as instance 408c with zero impressions 420c will have a lift rate 424c of −100% by default. In embodiments, the baseline conversion rate can be a predetermined conversion rate or a conversion rate for a default instance of a component, such as the default instance 208a shown in FIG. 2. In alternative embodiments, the baseline conversion rate can be set as the conversion rate of another instance. In another embodiment, the baseline conversion rate can be set to a predetermined value defined for the campaign.

Exemplary Data Flows

Figure 5:
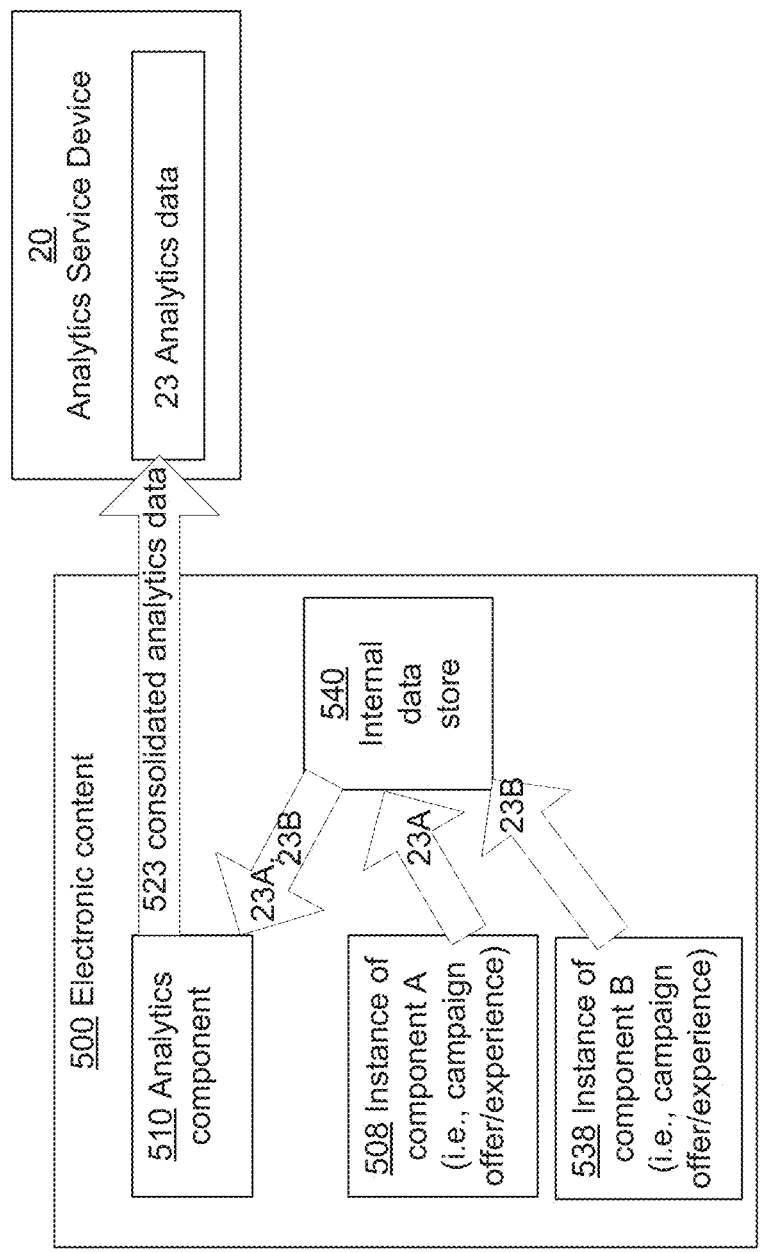
FIG. 5 illustrates an exemplary flow of analytics tracking using a consolidating analytics component.
Figure 6:
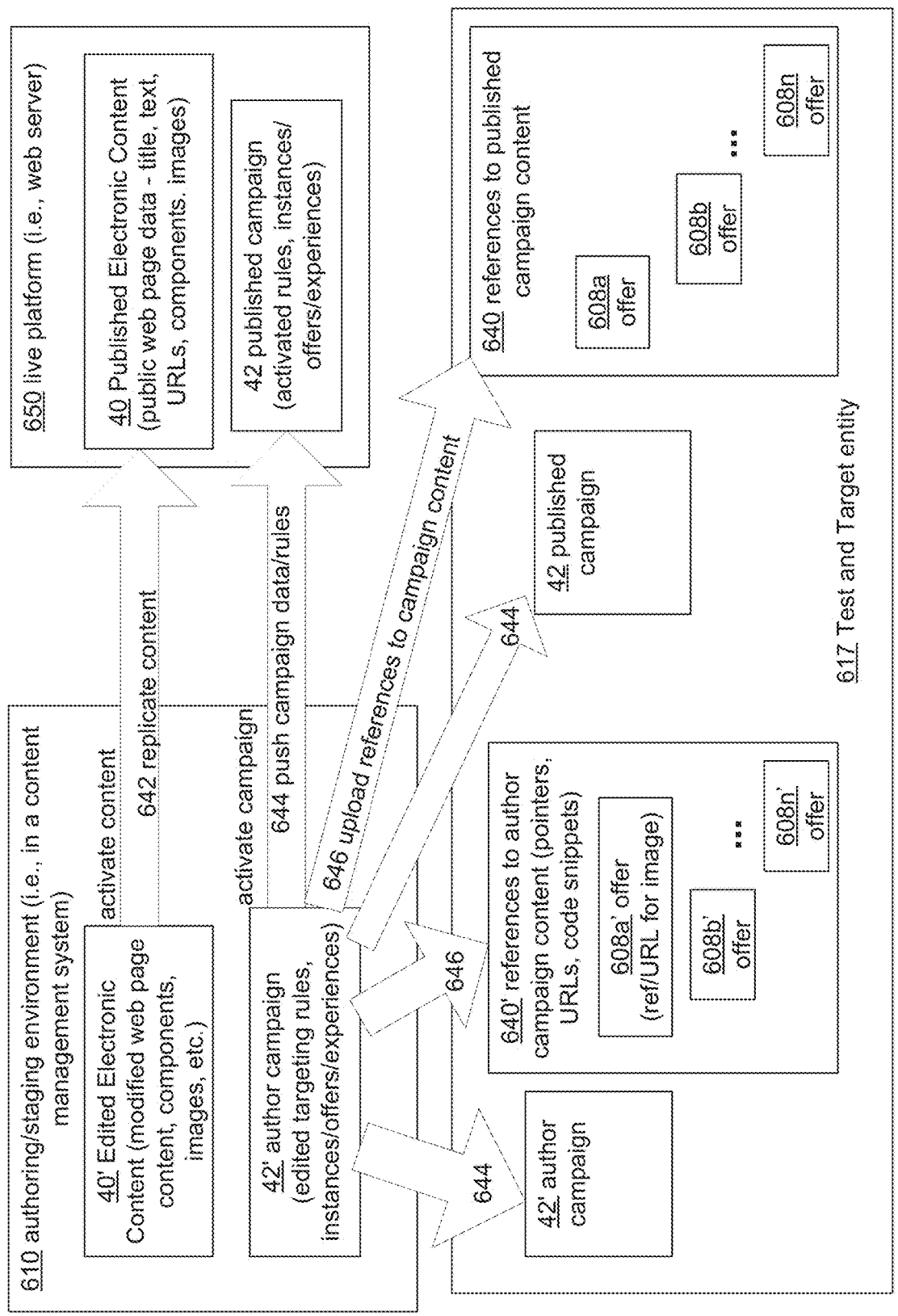
FIG. 6 illustrates exemplary flows of electronic content and campaign data, in accordance with embodiments.

FIGS. 5 and 6 illustrate exemplary data flows for analytics data and campaign data, respectively. The data flows depicted in FIGS. 5 and 6 are described with reference to the embodiments of FIGS. 1-4. However, the data flows are not limited to those example embodiments.

FIG. 5 shows how an author or web site developer may, in one embodiment, include a specific analytics component 510 for receiving and consolidating analytics messages from instances 508 and 538 of analytics-enabled components A and B, respectively. For example, in order to apply a mapping configuration established by map editor 15 to instrument a web page included in a campaign, the actual interpretation of the mapping, which may insert a translation layer between a component-specific instrumentation and web analytics system-specific instrumentation code to be embedded in the site, can be centralized in a single analytics component 510. Instead of configuring instrumentation for each component, template or page individually, an author or a web analyst can configure the centralized analytics component 510 once for each web site that is using a distinct mapping configuration. The centralized analytics component 510 will then be interpreted for each page in the site to apply an associated mapping.

FIG. 5 illustrates exemplary data flows for analytics tracking using a consolidating analytics component 510. In this example, electronic content 500 comprises an instance 508 of a component A and an instance 538 of component B. Instances 508 and 538 send respective analytics information 23A and 23B to an internal data store 540. In the non-limiting example of FIG. 5, the internal data store 540 is included in the electronic content 500 and stores analytics information 23A for instance 508 of component A and analytics information 23B for instance 538 of component B for use by consolidating analytics component 510. Analytics information 23A includes information about properties and events, such as, but not limited to, impressions and click-throughs/conversions, related to instance 508 of component A. Similarly, analytics information 23B comprises information about properties and user events related to instance 538 of component B. Consolidating analytics component 510 then consolidates the analytics information 23A and 23B into consolidated analytics data 523 and makes this consolidated analytics data 523 available for sending externally, for example, to the analytics service device 20. The consolidated analytics data 523 can be sent to the analytics service device 20 via network 5.

In embodiments, the electronic content 500 can be published electronic content 40 or edited electronic content 40'. If the electronic content 500 is edited electronic content 40', components A and B are included in an author campaign and their respective instances 508 and 538 are targeted to audiences pertinent to the author campaign. Alternatively, if the electronic content 500 is published electronic content 40, components A and B are included in an activated, published campaign and their respective instances 508 and 538 are targeted to audiences pertinent to the published campaign. In cases where the electronic content 500 is published electronic content 40, the consolidating analytics component 510 can be resident in the memory 32 of a content user device 30.

With continued reference to FIG. 5, execution of the electronic content 500, for example, by a web page visitor or other user using player 33 of content user device 30 of FIG. 1 or any other suitable device to play or use the content 500 can result in the collection and transmission of consolidated analytics data 523. For example, if instance 508 is targeted for a requestor of a web page comprising component A, tracked analytics information 23A from component instance 508 flows to internal system store 540, where the tracked analytics information 23A is based on an analytics mapping (perhaps based on a page template including an analytics component). The execution of instances 508 and 538 can involve injecting code to translate selected events and properties from internal stores into an external analytics system format usable by the analytics service device 20. The execution of instances 508 and 538 can further involve executing the translation code and sending translated tracking data to a web analytics system hosted by the analytics service device 20 and writing annotation data at the analytics system. The analytics mapping can be identified or loaded by the analytics component 510 searching for a mapping on the current web page. If no mapping is available, the analytics component 510 can load configuration from a parent web page or nearest ancestor web page. The analytics system may store the received data as analytics data 23 and use it, as examples, to write annotation data, and generate the appropriate reports (such as the reports shown in the analytics UI 402 of FIG. 4), or otherwise help inform content testing, targeting, measuring, and other electronic content management decisions. Providing tracked analytics information 23A and 23B from component instances 508 and 538, respectively, to an internal data store 540 can involve broadcasting the information to expose the information at a script layer, e.g., a JavaScript layer.

FIG. 6 illustrates exemplary data flows of electronic content and campaign data from an authoring environment 610 to a live platform 650 and a test and target entity 617. In one embodiment, the test and target entity 617 can be embodied as the test and target service 17 described above with reference to FIG. 1. In an additional or alternative embodiment, the test and target entity 617 can be a separate test and target system executing on a separate client computing device. The test and target entity 617 can include an execution engine for simulating execution of content of a published campaign 42 and for testing execution of components of an author campaign 42'. The execution engine can load published campaign content, such as images for offers 608a-n so that the published campaign 42 can be simulated on the test and target entity 617. As seen in FIG. 6, the authoring environment 610 can function as a staging environment for edited electronic content 40' and an author campaign 42'. In the example of FIG. 6, the authoring environment 610 can be implemented as part of a content management system and the live platform 650 can be embodied as a web server, such as the content provider device 50 shown in FIG. 1. In alternative embodiments, the authoring environment 610 can execute on a client computing device in communication with a content management system and the live platform 650 can be a file server, database server, or cloud-based storage device configured to host a copy of the published electronic content 40 and provide access to the content 40 to users.

FIG. 6 depicts two sets of data flows. The first set includes content replication 642 and campaign data push 644 from the authoring environment 610 to a live platform 650, and the second set of data flows comprises campaign data pushes 644 and campaign reference uploads 646 from the authoring environment 610 to a test and target entity 617. Content replication 642 replicates data from the edited electronic content 40' in the authoring environment 610 to the published electronic content 40 on the live platform 650. In the example of FIG. 6, the live platform 650 can be embodied as a web server for a public web site. As shown in FIG. 6, content replication 642 is triggered when the edited electronic content 40' is activated in the authoring environment 610. Content activation causes the edited electronic content 40' to be published and can be performed as a result of an author input into the authoring UI 302. Once the edited electronic content 40' is activated, the content replication 642 ensures that the live, published electronic content 40 matches the activated content. As shown in FIG. 6, the edited electronic content 40' can include modified web page data, such as, for example web page components, images, and other web page content. In the web page context, once edited electronic content 40' is activated and replicated to published electronic content 40, the public web page viewed by a visitors on the live platform 650 will reflect edits made to the web page content in the authoring environment 610. Although only a single live platform 650 is depicted in FIG. 6, it is to be understood that in environments where multiple copies of the published electronic content 40 are used, content replication 642 can replicate activated content from the authoring environment 610 to multiple live platforms.

FIG. 6 also shows that an author campaign 42' can be defined and modified in the in the authoring environment 610. Once an author activates the author campaign 42' data for the activated campaign is sent to the live platform 650 by performing a campaign data push 644. An author campaign 42' can be edited and activated using the targeting UI 202 and the authoring UI 302. A campaign data push 644 can transmit data from an activated author campaign to a published campaign 42 on the live platform 650. As shown, the author campaign 42' can include edited campaign content such as component instances/offers/experiences and targeting rules, and the published campaign 42 includes activated campaign content. Although the author campaign 42' and the edited content 40' are depicted as separate entities in FIG. 6, as discussed above, content for an author campaign 42' can be included in the edited content 40'. For example, as discussed above with reference to FIG. 1, campaign content can be a subset of the edited electronic content 40'. Similarly, while the published content 40 and the published campaign 42 are shown in FIG. 6 as separate logical entities, it is to be understood that content for the published campaign 42 can be part of in the published content 40.

In the non-limiting example of FIG. 6, the published electronic content 40 can include all of the data for a web page, such as the page's components, title, images, text, and URLs/links. The page's images can include, for example, a banner image that is targeted pursuant to rules in the published campaign 42. For the purpose of targeting, the published campaign 42 can include multiple instances of what could be displayed in that banner. The instance or experience displayed for the banner depends on what the targeting rules indicate for a given visitor. As there can be multiple variants or instances for each of a plurality of web page components targeted by the rules (i.e, a many-to-many relationship), it can be more efficient to store instances/experiences/offers and rules of a campaign in the published campaign 42 separately from web page content stored with the published electronic content 40. Although only a single author campaign 42' and a single published campaign 42 are shown in FIG. 6, it is to be understood that the data flows in FIG. 6 can be used in environments including multiple author and published campaigns. Each campaign 42' and 42 consists of an end number of potential user experiences. For these experiences, the campaigns 42' and 42 have respective content for specific locations on web page, such as a banner on a home page. Components and instances thereof can be used in (i.e., belong to) more than one campaign, much in the same way certain images can be used by more than one web page. In one embodiment, the published electronic content 40 includes default content for a web page. The default content is what will be shown on the page if there is no published campaign 42 for the page, no rules in the published campaign 42 apply to a web page visitor, or targeting is disabled for all targetable components of the page. The default content stored in the published electronic content 40, can include a default instance for each of the page's components, such as the default instance 208a shown in FIG. 2. That's also the content that you get when you disable the targeting again. that's part of the page.

Although FIG. 6 shows how content and a campaign can be activated separately, when the edited electronic content 40' includes web page content and the author campaign 42' has been successfully tested, an author may wish to activate the page together with the author campaign 42'. For example, the authoring UI 302 can be configured to prompt an author to activate a current author campaign 42' when the author activates edited electronic content 40' for a web page. This prompt may be displayed in the authoring UI 302 in response to determining that an author is activating edited electronic content 40' and an author campaign 42' applicable to the content 40' has been modified since the last content replication 642 has occurred. In cases where there are no changes in the edited electronic content 40' that an author wishes to activate, a modified author campaign 42' can be activated without first activating the content 40'. For example, if a web site structure and web page contents have not changed since the last content replication 642, but an author campaign 42' has been changed to include a new experience, the campaign 42' can be activated to initiate the push 644 of campaign data and rules to the published campaign 42 on the live platform 650. In this scenario, the data flows in FIG. 6 will modify the published campaign 42 on the live platform and the copy of the campaign 42 on the test and target entity 617 via respective pushes 644 of campaign data without performing a replication 642 of the web page content. In this way, an author only has to activate an author campaign 42' to push it out to the live platform 650.

With continued reference to FIG. 6, another campaign data push 644 from the authoring environment 610 to the test and target entity 617 is performed so that a copy of the author campaign 42' on the test and target entity 617 reflects edits made in the authoring environment 610. This campaign data push 644 to the author campaign 42' on the test and target entity 617 can be performed periodically and is not tied to or triggered by campaign activation. In one embodiment, the campaign data push 644 from the authoring environment 610 to the author campaign 42' on the test and target entity 617 is performed in response to an author explicitly saving (i.e., committing) a change to content of the author campaign 42' in the authoring environment 610. According to another embodiment the campaign data push 644 to the copy of the author campaign 42' on the test and target entity 617 is automatically performed after every modification to the author campaign 42' done in the authoring environment 610. Another campaign data push 644 sends activated campaign content from the authoring environment 610 to a copy of the published campaign 42 on the test and target entity 617. According to an embodiment, this campaign data push 644 is performed substantially simultaneously with the campaign data push 644 from the authoring environment 610 to the live platform 650. In embodiments, the campaign data pushes 644 and the reference uploads 646 to the test and target entity 617 can be performed using a test and target API. For example, the authoring environment 610 can use calls to the test and target API to initiate data pushes 644 and reference uploads 646.

Data flow from the authoring environment 610 to the test and target entity 617 also includes campaign reference uploads 646. One campaign reference upload 646 transmits references to campaign content from the author campaign 42' in the authoring environment 610 to a set of references 640' to author campaign content on the test and target entity 617. In embodiments, this campaign reference upload 646 can be performed periodically or in response to changes to an author campaign 42' being saved in the authoring environment 610. According to one embodiment this campaign reference upload 646 to the references 640' to author campaign content on the test and target entity 617 is automatically performed after every modification to the author campaign 42' carried out in the authoring environment 610. As shown, another campaign reference upload 646 transmits references to campaign content for an activated campaign from the authoring environment 610 in order to populate a set of references 640 to published campaign content on the test and target entity 617. As illustrated in FIG. 6, this second campaign reference upload 646 is performed when an author campaign 42' is activated in the authoring environment 610. In embodiments, this campaign reference upload 646 for an activated campaign is performed in parallel or substantially simultaneously with the campaign data push 644 of activated campaign data from the authoring environment 610 to the live platform 650.

By performing the campaign data pushes 644 and reference uploads 646 shown in FIG. 6, an author campaign 42' being edited in the authoring environment 610 can be tested and compared to the current production campaign 42 on the test and target entity 617. These data flows provide synchronization and integration between the authoring environment 610 and the test and target entity 617 so that the test and target entity 617 can separately simulate an author campaign 42' and a published campaign 42 by simultaneously having two separate campaigns 42' and 42. In this way the test and target entity 617 can mimic the separation of the published electronic content 40 and the edited electronic content 40' that exists on the content creation/editing device 10 shown in FIG. 1. On the test and target entity 617, this separation can be achieved by assigning different names to the author campaign 42' and a published campaign 42. For example, logical names of one or more data objects, such as directories, database objects, and files, used to store the copy of the author campaign 42' and the references 640' to the author campaign content can include an "-author" suffix or an "author-" prefix so that the author campaign 42' is kept separate from the published campaign 42 on the test and target entity 617. This separation allows side by side testing, targeting and measuring of campaign components on the test and target entity 617 without requiring interaction with the published content 40 on the live platform 650.

After satisfactorily testing an author campaign 42' on the test and target entity 617, an author can activate the campaign and publish it via content replication 642 and campaign data push 644 to the live platform 650. FIG. 6 shows how electronic content and a campaign can be modified in the authoring environment 610 and tested and compared to a live, published campaign 42 without affecting operations on the live platform 650. This configuration can advantageously avoid creation of 'false' analytics data 23 resulting from testing web pages and simulating targeting using published electronic content 40 hosted on the live platform 650. This also allows an author to simulate certain actions, such as, for example, web site purchases, using a published campaign 42 without having to carry out the actual actions on the public web site hosted on the live platform 650. Due to the data integration provided by content replication 642, campaign data pushes 644, and campaign reference uploads 646, the authoring environment 610 can be used in conjunction with the test and target entity 617 and the live platform 650 to change, test and activate web site content and targeting for a campaign. In an embodiment, all data for the author campaign 42' and the published campaign 42 is copied to the test and target entity 617 so that simulation and testing on the test and target entity 617 can execute the full set of targeting rules and code in both campaigns 42' and 42. In this way, actual calls to campaign components can be made using the author campaign 42' activated, live components of the published campaign 42 can also be used on the test and target entity 617.

The data flows shown in FIG. 6 illustrate how, as an author creates or changes an experience or adds content to an author campaign 42', a copy of the author campaign 42' on the test and target entity 617 can be quickly updated in the background. As a result of the data flows, an author can enable simulation mode for the current author campaign 42' for a particular audience. For example, by using the author campaign 42' and the references 640', the test and target entity 617 can be used to simulate how offers 608a'-n' will be rendered to a web site visitor who is a female under 30. As shown in FIG. 6, instead of replicating copies of all of the edited electronic content 40' and the published electronic content 40 to the test and target entity 617, references 640' and 640 can be uploaded. The references 640' to author campaign content, can include, for example, pointers, URLs, storage addresses, and/or code snippets that can be used to retrieve edited electronic content 40' corresponding to the referenced campaign content. As shown, an offer 608a' can include a URL for an image asset used for the offer 608a' so that when the author campaign 42' is run on the test and target entity 617, the current targeting rules in the author campaign 42' are executed and the correct image for the offer 608a' is displayed.

By uploading references 640' and 640 to author and campaign content instead of full copies of the edited electronic content 40' and the published electronic content 40, the upload time is reduced, which facilitates quicker update cycles between the authoring environment 610 and the test and target entity 617. For example the offers 608a'-n' and 608a-n represent content of the author campaign 42' and the production campaign 42, respectively. In the embodiment of FIG. 6, relatively small, lightweight references to the content for these offers is uploaded instead of copies of the content. In an embodiment, respective code snippets for the offers 608a'-n' and 608a-n are uploaded to the test and target entity 617. According to this embodiment, each of the code snippets contain HTML code, text, and an reference to an image to be displayed for a respective offer 608. Offers 608a'-n' and 608a-n can be the same between an author campaign 42' and a published campaign 42 because each offer 608 is defined by its location. For example, an offer 608a' and another offer 608a can each include a respective URL and an address in a content management system. The offers 608a' and 608a can both include a reference that points to the same image stored in the content management system, such as content-images-logo.jpg. Instead of uploading two copies of that jpg image file to the test and target entity 617, the reference uploads 646 depicted in FIG. 6 can upload small code snippets which include a reference the jpg file and instructions executable by the test and target entity 617 to retrieve and display the content-images-logo.jpg image when either of the offers 608a' or 608a are rendered. In this embodiment, the offers 608a'-n' and 608a-n are basically lightweight pointers to content on a content management system. In one embodiment, the code snippet for an offer 608 is a relatively small JavaScript snippet which instructs a content management system to load content located at a URL included in the snippet. By using offers 608a'-n' and 608a-n and the campaigns 42' and 42, the test and target entity 617 can identify a segment or audience based on targeting rules in the campaigns and find the correct content for a particular offer, where the content is represented by a reference, such as a URL. At this point, the test and target entity 617 can send a request for that URL to a content management system where the content is stored and subsequently display the content returned by (i.e., served) by the content management system.

Exemplary Method

Figure 7:
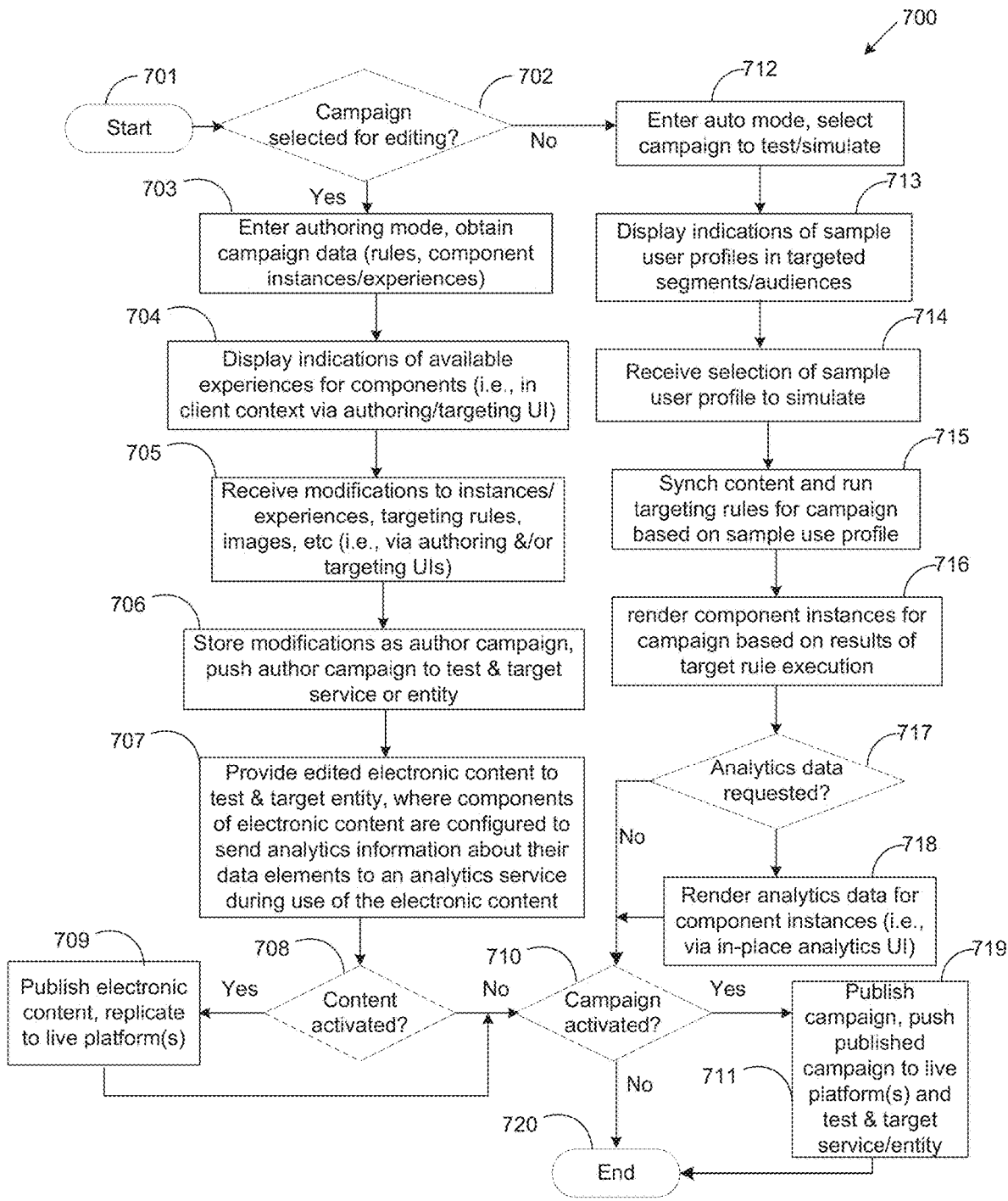
FIG. 7 is a flow chart illustrating an exemplary method of editing, testing, and publishing analytics-enabled electronic content and campaign data.

FIG. 7 is a flow chart illustrating an exemplary method 700 of editing, testing and providing analytics-enabled electronic content and campaign data. Such an exemplary method 700 may be performed on a variety of computer devices including, but not limited to, the content creation/editing device 10 of FIG. 1 and the computing system 900 of FIG. 9. For purposes of illustration and not limitation, the features of exemplary method 700 are described with reference to elements of FIGS. 1-6. In embodiments, portions of the method 700 can be performed by a content synchronization service.

The method 700 starts in step 701 and proceeds to step 702 where a determination is made as to whether a campaign has been selected for editing. If it is determined that an existing campaign has been selected for editing, control is passed to step 703 where authoring mode is entered for the selected campaign. Otherwise, control is passed to step 712, where auto mode is entered and a campaign is selected for testing/simulation.

In step 703, authoring mode is entered. Authoring mode can be entered within a client context in an authoring/staging environment 610. As shown, step 703 can comprise obtaining campaign data, such as, for example, targeting rules and component instances (i.e., experiences and offers). This step can involve reading campaign data for an existing, published campaign 42 that an author wishes to edit via the targeting UI 202 and/or authoring UI 302. This step can also involve getting campaign data for an existing, author campaign 42' that an author wishes to further modify via the UIs 202 and/or 302. After the campaign data is obtained, control is passed to step 704.

In step 704, indications of available experiences (i.e., component instances) of the selected campaign are listed. This can be done, for example, within a client context in a targeting UI 202 or an authoring UI 302 rendered in an authoring/staging environment 610. Step 704 can include displaying icons of experiences in an experience switcher 204. After the experiences are listed, control is passed to step 705.

Next, in step 705, modifications to the selected campaign are received. As shown in FIG. 7, this step can comprise receiving edits to instances/experiences, targeting rules, images, or other campaign data via the authoring UI 302 and/or the targeting UI 202.

In step 706, the modifications received in step 705 are stored as an author campaign, and the author campaign is pushed to a test and target service. As shown, in one embodiment, step 706 can comprise pushing the author campaign to a test and target entity, such as the test and target entity 617 of FIG. 6. For example, step 706 can be performed by completing the campaign data push 644 of the author campaign 42' shown in FIG. 6. Alternatively, the author campaign can be pushed to the test and target service 17 of FIG. 1. After the author campaign is saved and pushed, control is passed to step 707.

In step 707, edited electronic content is provided to the test and target service (or entity). As shown, the electronic content can comprise components configured to send information about its data elements to an analytics service during use of the electronic content. The electronic content provided by step 707 may be edited electronic content 40' comprising author components, images, web page data, and a single consolidation analytics component 510 configured to receive identifications of occurrences of all events mapped for tracking by the analytics service and to expose all events mapped for tracking by the analytics service by, for example, providing client-side broadcasts to a script layer of the electronic content. The electronic content may comprise a receiver configured to receive the client-side broadcasts, convert the client-side broadcasts to the information about the data element, and send the information about the data elements to a server of the analytics service. The edited electronic content 40' can include web pages configured to include receivers that are web analytics features added to the web pages. Such receivers may register themselves with the analytic consolidation component 510 to receive particular tracking broadcasts. The analytic consolidation component 510 can go over its list of subscribers and forward to appropriate receivers. Individual subscriber receivers can convert/translate and send one or more remote messages. In one embodiment, a single instance of the consolidation component 510 may be configured to maintain, based on the mapping, identities of a plurality of receivers to receive client-side broadcasts regarding the mapped events or properties. After the edited electronic content is provided, control is passed to step 708.

In step 708, a determination is made as to whether the edited content has been activated. If it is determined that the content has been activated, control is passed to step 709 where the activated content is published and replicated to one or more live platforms. Otherwise, control is passed to step 710.

Step 709 can publish the activated electronic content by performing the content replication 642 to replicate published electronic content 40 to a live platform 650 as shown in FIG. 6. After the electronic content is published, control is passed to step 710.

In step 710, a determination is made as to whether the author campaign has been activated. If it is determined that the campaign has been activated, control is passed to step 719 where the activated campaign is published and pushed to one or more live platforms and the test and target entity (or service). Otherwise, control is passed to step 720 where the method 700 ends.

Steps 712-718 simulate a campaign. In step 712, auto mode is entered and a campaign is selected for testing/simulation before passing control to step 713, where indications of sample user profiles in targeted segments/audiences are displayed. Next, in step 714, a selection of a sample user profile is received and then control is passed to step 715 where content, such as instances, experiences, and offers, is synchronized and targeting rules are run for the campaign based on the user profile selected in step 714.

Next, in step 716, component instances are rendered for the campaign based on the results of running the targeting rules in step 715. At this point, in step 717, a determination is made as to whether analytics data has been requested. If it determined that analytics data has been requested, control is passed to step 718 where analytics data for component instances is rendered. As shown, step 718 can be performed via an in-place analytics UI, such as for example, the analytics UI 402 of FIG. 4. Otherwise, if step 717 determines that no analytics data has been requested, control is passed to step 710.

Exemplary Workflows

FIGS. 8A-8E depict exemplary workflows for editing a campaign via a user interface 802. Throughout FIGS. 8A-8E, displays are shown with various icons, buttons, links, command regions, dialog boxes, popup windows, toolbars, menus, and lists that are used to initiate action, invoke routines, create and modify campaigns, create and modify segments, create and edit component variants (i.e., experiences and offers), or invoke other functionality. The initiated actions include, but are not limited to, selecting a user profile corresponding to a segment, defining and modifying a campaign, creating and editing an experience or offer in a campaign, defining and modifying targeting rules, and other campaign-related actions. For brevity, only the differences occurring within the figures, as compared to previous or subsequent ones of the figures, are described below. The interfaces depicted in FIGS. 8A-8E can be used by an author to create, test, and modify campaigns.

Figure 8A:
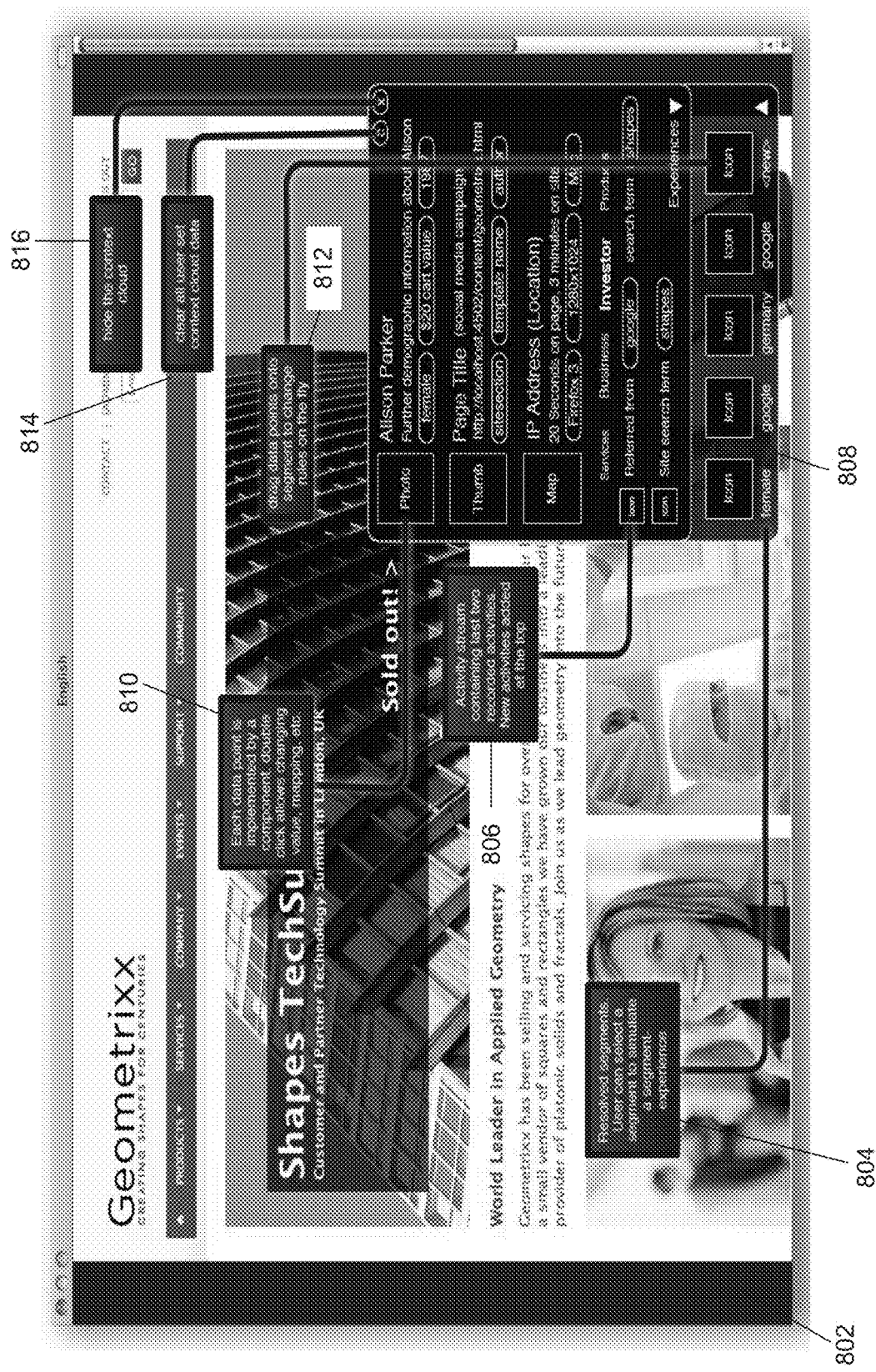
FIGS. 8A-8E illustrate an exemplary work flow for testing and targeting web site components in an exemplary user interface, in accordance with embodiments.

FIG. 8A shows how in step 804, an author or other authorized user can select a segment shown in popup window 808 to simulate. As shown, the popup window 808 can display demographic information about a selected user profile, such as gender, past web page activity, and a birth year. The popup window 808 can also display a thumbnail for a web page related to a campaign, a related web page title, a URL, a campaign title (e.g., 'social media campaign') and site section information, a template name, and an author. The popup window 808 can also show analytics information, such as map/mapping, an Internet Protocol (IP) Address (i.e., an access location), a browser used to access a page, a display resolution, a platform of a client device used to access the page (e.g., Mac), and web site/page usage information (e.g., '20 Seconds on page, 3 minutes on site').

An experience for a selected segment (or audience) can be rendered as a segment-experience. Step 806 shows how an activity stream containing the last (i.e., most recent) recorded activities can be shown. In the non-limiting example of FIG. 8A, the last two recorded activities are shown in the popup window 808 and new activities are added at the top of the list. As shown, the activities can include referrals from another page and a search term submitted to the page or the referral page. Step 810 shows how each data point can be implemented by a component and how an input or selection (i.e., a double click in the example of FIG. 8A) allows a value to be edited/changed, mapped, or otherwise modified. FIG. 8A also shows that by selecting the cancel button 814 in the popup window 808, an author can clear all user-entered context data (such as user-set context cloud data). FIG. 8A also shows how a selection of the close button 816 in the popup window 808 will hide the context data (i.e., the context cloud data).

Figure 8B:
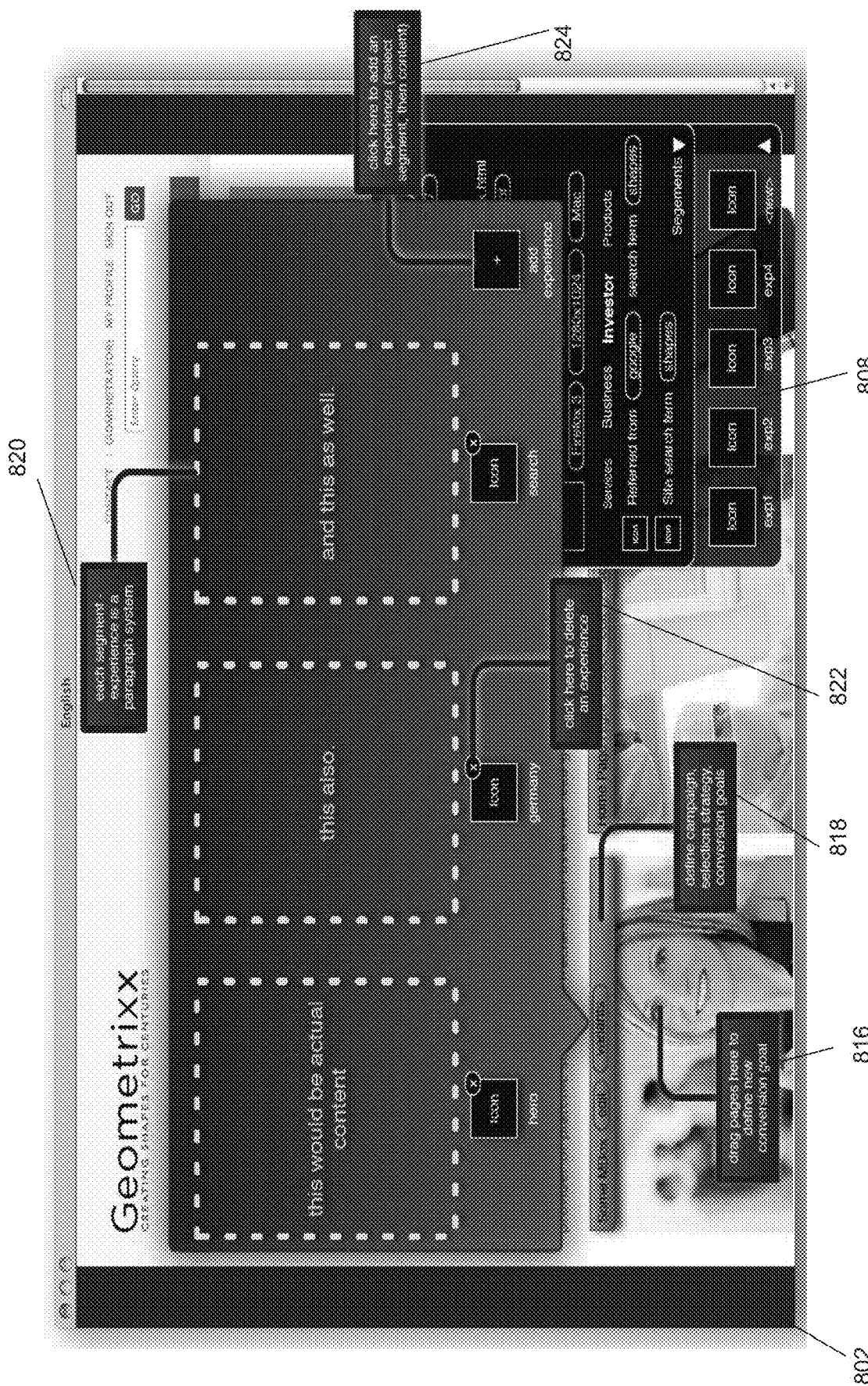

FIG. 8B shows how content such as web page can be dragged to an editing window 816 to define new conversion goals. Examples of conversion goal could be an increased conversion rate 422 or increased lift rate 424 as described above with reference to FIG. 4. FIG. 8B shows how an edit toolbar 818 can be used to define a campaign, selection strategy, and/or conversion goals for a web page dragged to the editing window 816. The UI 802 also includes a delete button 822 that can be selected (i.e., clicked in the example of FIG. 8) to delete a displayed component instance or experience. The UI 802 can also render actual content (i.e., as a live preview) and related rules, metadata, etc. for each segment-experience 820. As shown in FIG. 8B, the actual content and experience for each segment-experience 820 can be conceptualized as a paragraph system or hierarchy. Lastly, FIG. 8B shows that the add experience button 824 can be selected within the UI 802 to add an experience for a selected segment. In the example of FIG. 8B, content for the experience can be selected after the segment is selected.

Figure 8C:
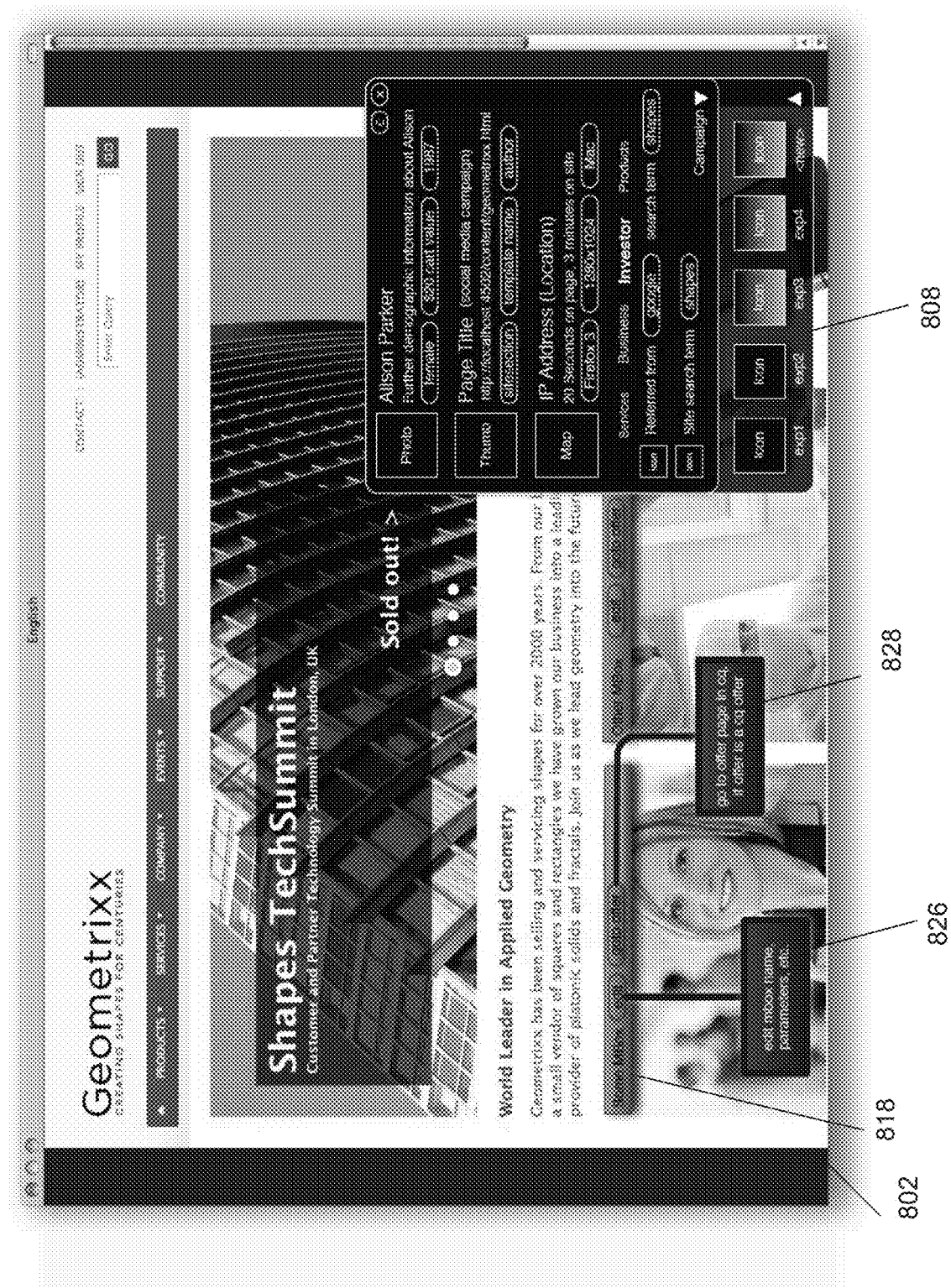

FIG. 8C shows how an edit button 826 in the edit toolbar 818 can be used to edit a component name or parameters and how a goto offer button 828 can be selected to go to a component instance (i.e., an offer page) in a component management system. In the non-limiting example of FIG. 8C, if an offer is an Adobe® Experience Manager (formerly Adobe® CQ) offer, the goto offer button 828 can go to an offer page in Adobe® Experience Manager.

Figure 8D:
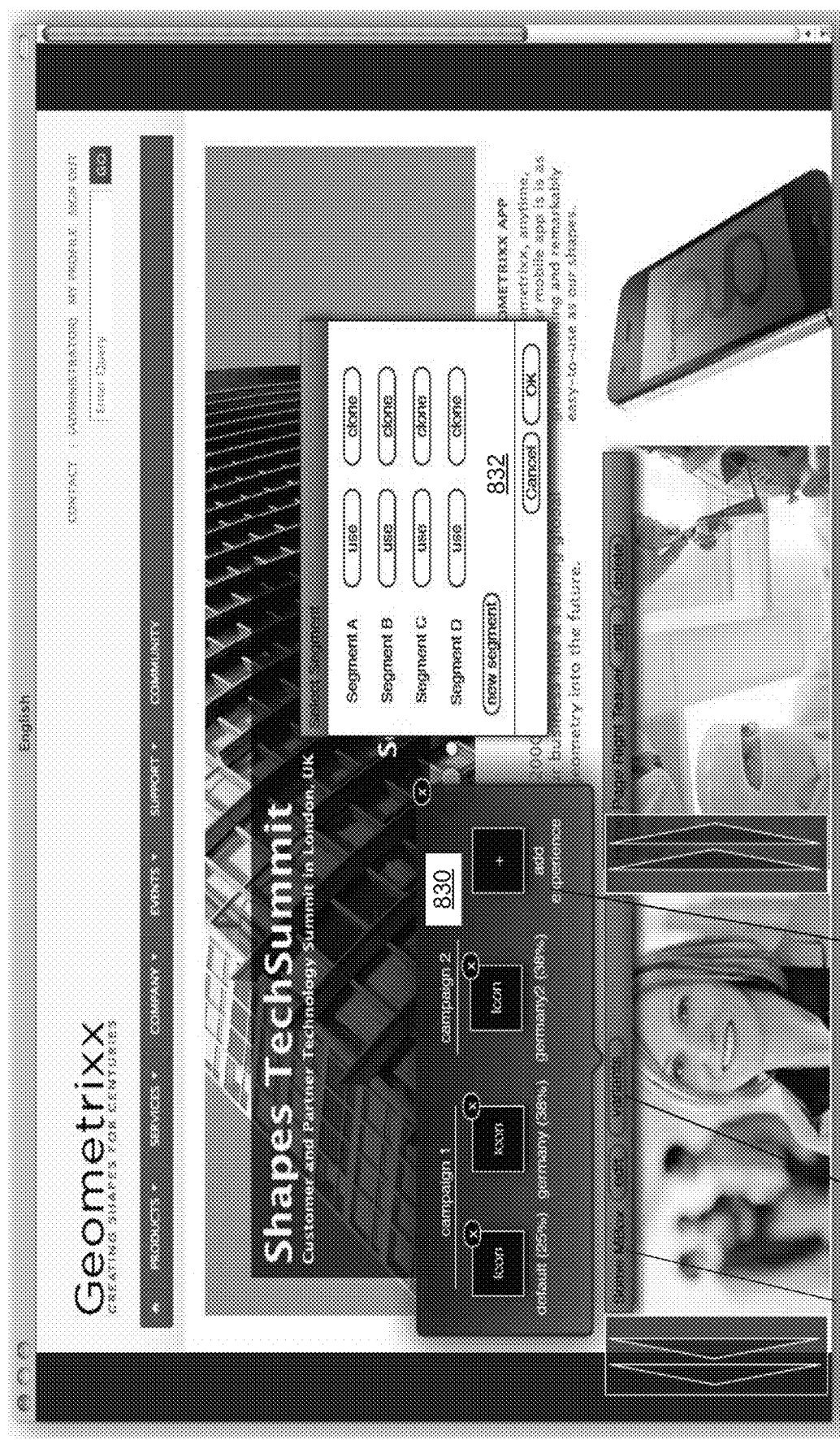
Figure 8E:
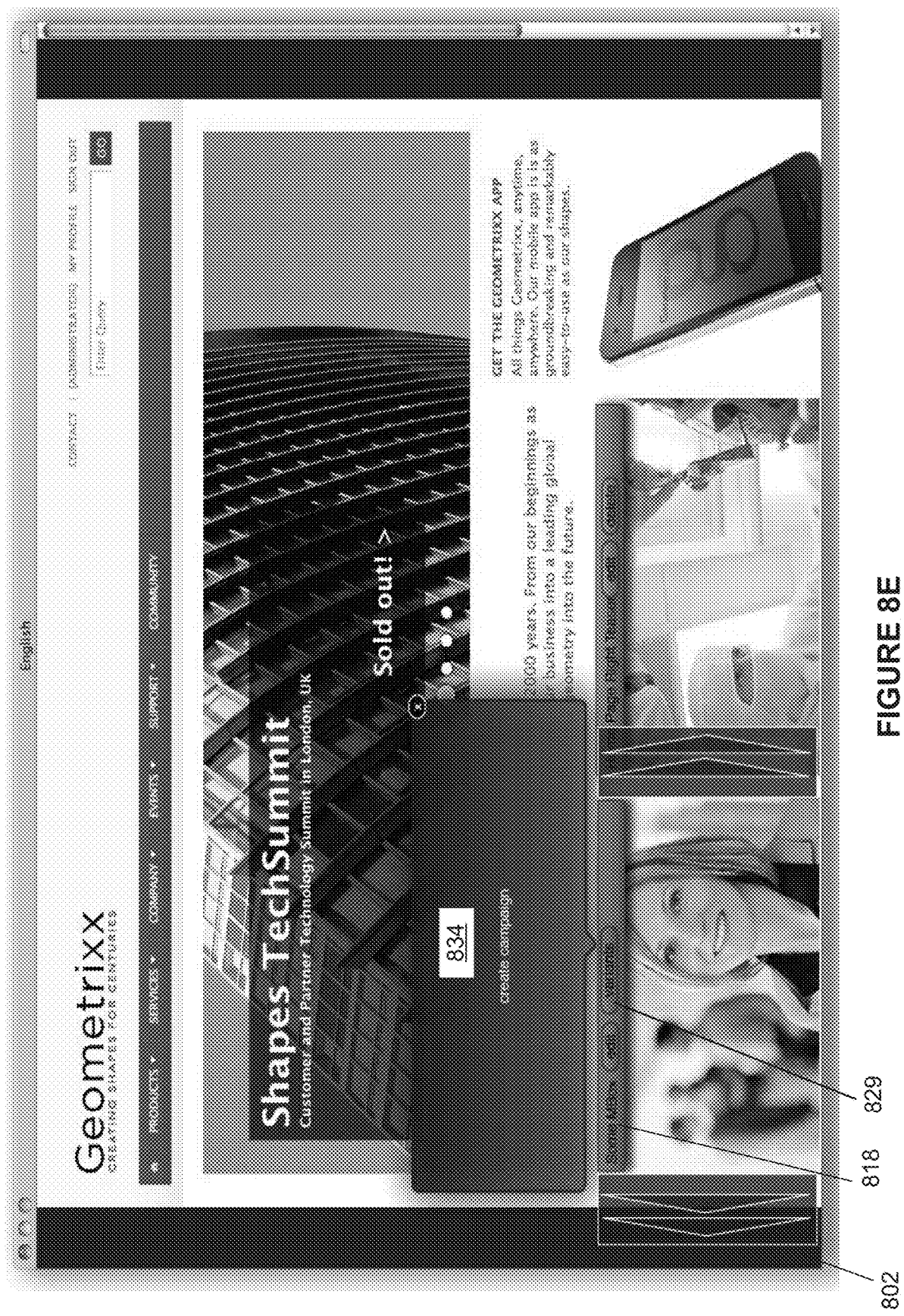

FIG. 8D shows how the variants button 829 can be selected in the edit bar to display an instances popup 830 with icons of instances for a campaign. As shown the instances popup 830 includes icons for a default instance and other instances experiences for one or more campaigns, in addition to the add experience button 824. FIG. 8D also shows that UI 802 includes a segment selection popup 832 usable to select, clone (i.e., copy) and create segments. FIG. 8E shows how a create campaign popup 834 can be rendered in the UI 802 if the variants button 829 is selected in the edit toolbar 818 and no campaign has been created yet.

Another exemplary workflow (not shown) in which analytics is enabled for electronic content involves a team attempting to instrument tracking of an image used in a group of web pages of a web site. The author of the image component creates the component and identifies properties to track such as size, name, etc. The author can use an Application Programming Interface (API) to reference this information from within the component's code, for example, identifying that the image is 500 pixels wide, its file name etc. As a particular example, the author may use a programming interface to call a method or add an attribute in the source code of the component and/or to add metadata to component to describe what properties and events can be tracked. An example of changing metadata involves changing a JCR repository property. The author may also add an analytics consolidation component that can be included in each of the web pages to collect tracked data. The developer's efforts may result in a component that always exposes the exposed properties and events allowing another user to set up a mapping that will set up receivers to receive some or all of the always-broadcasted information. In other words, in this example, the component instances will always broadcast regardless of whether anything is configured to listen or otherwise receive the broadcasts. After exposing the events and properties of the component, a marketing analyst or other user creates a mapping to provide a framework that specifies which information will actually be tracked, how it will be converted, and to where it will be sent, e.g., to which analytics service. Web pages with the image included are launched and are analytics-enabled because instances of the image in the web pages send the map-identified tracked information to a collector instance that makes the information available to receivers that send the information to the specified (in the mapping) external analytics service. Numerous other permutations and workflows are also possible.

Exemplary Computer System Implementation

Figure 9:
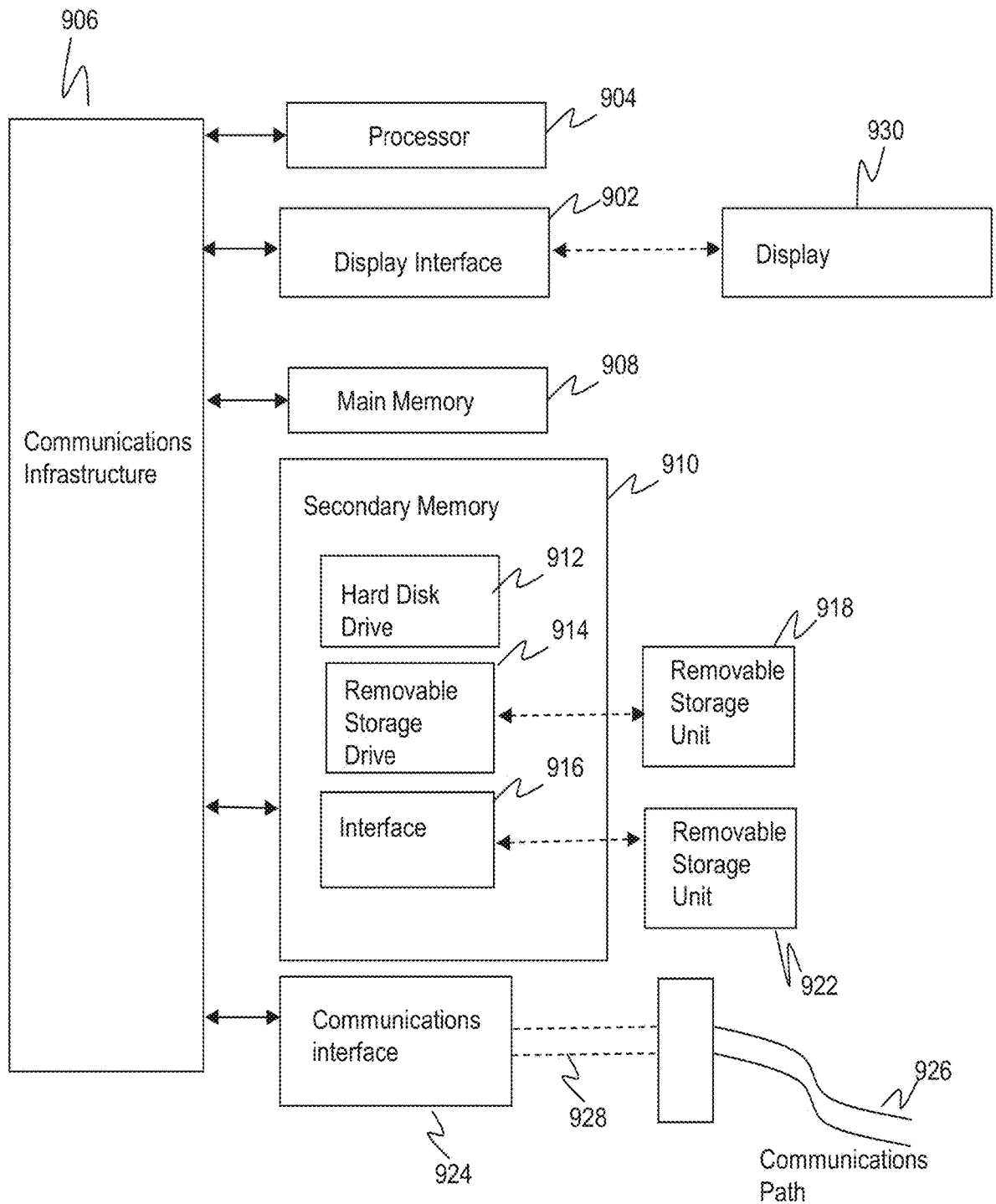
FIG. 9 is a computer system in which embodiments can be implemented.

Although exemplary embodiments have been described in terms of systems and methods, it is contemplated that certain functionality described herein may be implemented in software on microprocessors, such as a microprocessor chip included in computing devices such as the computing devices 10, 20, 30 and 50 shown in FIG. 1 and the computer system 900 illustrated in FIG. 9. In various embodiments, one or more of the functions of the various components may be implemented in software that controls a computing device, such as computer system 900, which is described below with reference to FIG. 9.

Aspects of the present invention shown in FIGS. 1-8, or any part(s) or function(s) thereof, may be implemented using hardware, software modules, firmware, tangible computer readable media having logic or instructions stored thereon, or a combination thereof and may be implemented in one or more computer systems or other processing systems.

FIG. 9 illustrates an example computer system 900 in which embodiments of the present invention, or portions thereof, may be implemented as computer-readable instructions or code. For example, some functionality performed by the computing devices 10, 20, 30 and 50 and their respective modules shown in FIG. 1, can be implemented in the computer system 900 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the methods 700, 800, and 900 illustrated by the flowcharts of FIGS. 7, 8 and 9 discussed above. Similarly, hardware, software, or any combination of such may embody the editors 13, 14 and 15, the test and target service 17 and the content player 33 discussed above with reference to FIG. 1.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme. In certain embodiments, one or more of the processors 9, 21, 31 and 51 described above with reference to the computing devices 10, 20, 30 and 50 of FIG. 1 can be embodied as the processor device 904 shown in FIG. 9.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. In non-limiting embodiments, one or more of the memories 12, 22, 32 and 52 described above with reference to the computing devices 10, 20, 30 and 50 of FIG. 1 can be embodied as the main memory 908 shown in FIG. 9.

The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a non-transitory computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or EEPROM) and associated socket, and other removable storage units 922 and interfaces 920 which allow software and data to be transferred from the removable storage unit 922 to computer system 900. In non-limiting embodiments, one or more of the memories 12, 22, 32, and 52 described above with reference to the computing devices 10, 20, 30 and 50 of FIG. 1 can be embodied as the main memory 908 shown in FIG. 9.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 908 and secondary memory 910, which can be memory semiconductors (e.g., DRAMs, etc.). Computer readable medium and non-transitory computer readable medium can also refer to removable storage unit 918, removable storage unit 922, and a hard disk installed in hard disk drive 912. Signals carried over communications path 926 can also embody the logic described herein. These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the steps in the method 700 illustrated by the flowchart of FIG. 7, discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

In an embodiment, the display device 9 used to display interfaces of the content creation/editing device 10, may be a computer display 930 shown in FIG. 9. The computer display 930 of computer system 900 can be implemented as a touch sensitive display (i.e., a touch screen). Similarly, the user interfaces shown in FIGS. 2-4 and 8 may be embodied as a display interface 902 shown in FIG. 9.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method for modifying, targeting, and testing website components, the method comprising:
   receiving, at a content editing device, an indication of an on-line promotional campaign including a website component and multiple instances of the website component, wherein:
      the website component comprises events and properties mapped to corresponding data elements to be tracked by an analytics service device and further comprises a template for the multiple instances, and each instance of the multiple instances is associated with targeting rules and digital assets;
   displaying, in a user interface (UI) of the content editing device, visual indications of the multiple instances of the website component, wherein:
      the UI is configured to receive input specifying modifications to one or more of the website component, the associated digital assets, or the associated targeting rules, and
      the UI is further configured to display analytic information associated with one or more of the multiple instances;
   receiving, via the UI, the input specifying modifications to one or more of the website component, the associated targeting rules, or the associated digital assets;
   synchronizing, by a content synchronization service on the content editing device, the modifications to multiple remote computing devices responsive to receiving the input, wherein the synchronization includes:
      providing, by the content editing device and to a first computing device hosting a live platform, website content comprising the on-line promotional campaign and the website component, wherein the website content is configured to send analytics data measuring visitor interactions with the mapped events and properties of the website component to the analytics service device during use of the website content, and
      providing the website content to a second computing device hosting a test-and-target service, the test-and-target service being configured to display the website content and simulate the on-line promotional campaign and visitor interactions with the website component; and
   displaying, in the UI, at least a portion of the analytics data, the analytics data indicating a performance of the website content provided to the first computing device.

2. The method of claim 1, wherein:
   the associated targeting rules include logic for determining which ones of the multiple instances are to be displayed to a given segment or audience of users of the website content;
   the UI includes a content targeting interface, wherein the content targeting interface is configured to receive input specifying a target of a selected one of the multiple instances, wherein specifying the target includes wrapping the website component in an additional component targeting a particular segment or audience; and
   the visual indication of the targeted one of the multiple instances includes an indication of a segment or audience for the targeted instance, the method further comprising:
      in response to determining one or more attributes of a user of the website content, categorizing the user as part of the particular segment or audience; and
      selecting, based on the associated targeting rules, the targeted one of the multiple instances to be displayed to the user.

3. The method of claim 1, wherein the providing the website content to the second computing device comprises uploading at least a portion of the website content from the content editing device to the second computing device, the method further comprising:
   in response to receiving, via the UI, input indicating modifications to one or more of the website component, the associated targeting rules, or the website component, pushing the modifications to the second computing device.

4. The method of claim 1, further comprising, in response to receiving input, via the UI, indicating activation of the on-line promotional campaign:
   saving the on-line promotional campaign as a published campaign; and
   pushing the published campaign to:
      the live platform configured to provide the website content to users; and
      the second computing device hosting the test-and-target service, wherein the test-and-target service is further configured to simulate use of the website content by users having selected user profiles.

5. The method of claim 1, further comprising, in response to receiving, via the UI, a request to display the analytics data, displaying, in the UI, at least the portion of the analytics data.

6. The method of claim 1, wherein the receiving, via the UI, input specifying modifications comprises:
   receiving, via the UI, a selection of the on-line promotional campaign; and
   receiving, via the UI, input indicating one or more modifications to a selected instance of the website component, and
   wherein the providing the website content to the second computing device comprises uploading references to the multiple instances of the website component to the second computing device hosting the test-and-target service.

7. The method of claim 1, wherein the providing the website content to the second computing device comprises uploading references to the website content to a test environment, the references including one or more pointers, Uniform Resource Locators (URLs), and executable code for retrieving and displaying the website content at the second computing device hosting the test-and-target service.

8. The method of claim 1 wherein the on-line promotional campaign is a promotion or marketing campaign corresponding to one or more of a time-frame, a duration, a date range, and a geographic region.

9. The method of claim 1, wherein:
the website content comprises at least one web page comprising at least one targetable website component;
the associated targeting rules include logic for targeting the targetable website component to a segment of visitors to the at least one web page; and
the segment is associated with attributes of visitors to the at least one web page, the attributes including one or more of: an age range; a gender; a nationality; a citizenship; an access time; a duration of access; an access platform; an Internet Protocol (IP) address; a residence location; a business address; a shipping address; an occupation; a title; an employer; a referring page; a language preference; a purchase history; an email domain; and an ethnicity.

10. The method of claim 1, further comprising, prior to the providing the website content to the second computing device, displaying the website content in the UI, the UI being further configured to accept input indicating, for a selected instance of the website component, one or more of:
targeting the selected instance to an audience of users of the website content;
a modification to an image associated with the selected instance;
deletion of the selected instance;
annotation of the selected instance; and
disabling targeting of the selected instance.

11. The method of claim 1, further comprising displaying, in the UI, indications of which of the events or properties of the website component are exposed for analytics.

12. The method of claim 1, wherein the website content comprises:
one or more web pages or one or more rich Internet applications; and
website components of the one or more web pages or one or more rich Internet applications.

13. The method of claim 1, wherein the website component comprises one or more of:
code identifying the events and properties;
metadata identifying the events and properties; and
at least one declarative statement identifying the events and properties.

14. The method of claim 1, wherein the UI is further configured to accept input indicating creation of a new instance of the website component, the new instance included in the on-line promotional campaign, wherein the new instance is targeted to an audience or segment differing from audiences or segments targeted for other instances of the website component.

15. The method of claim 14, wherein the events or properties of the website component automatically apply to the new instance.

16. A system comprising:
a processor;
a display device; and
a memory having instructions stored thereon, that, if executed by the processor, cause the processor to perform operations comprising:
receiving an indication of an on-line promotional campaign including a website component and multiple instances of the website component, wherein the website component comprises events and properties mapped to corresponding data elements to be tracked by an analytics service device, and further comprises a template for the multiple instances of the website component for use in a website, and wherein each instance of the multiple instances is associated with targeting rules and digital assets;
rendering, on the display device, a user interface (UI) including visual indications of the multiple instances of the website component, wherein:
the UI is configured to receive input specifying modifications to one or more of the website component, the multiple instances of the website component, or the targeting rules or digital assets associated with the multiple instances of the website component,
the UI is further configured to display analytic information associated with one or more of the multiple instances;
receiving, via the UI, the input specifying modifications to one or more of the associated targeting rules, the associated digital assets, or the website component,
synchronizing, by a content synchronization service, the modifications to multiple remote computing devices, wherein the synchronization includes:
providing, to a first computing device hosting a live platform, website content comprising the on-line promotional campaign and website component, wherein the website content is configured to send analytics data measuring visitor interactions with the mapped events and properties of the website component to the analytics service device during use of the website content, and
providing the website content to a second computing device hosting a test-and-target service, the test-and-target service being configured to display the website content and simulate the on-line promotional campaign and visitor interactions with the website component; and
displaying, in the UI, at least a portion of the analytics data, the analytics data indicating a performance of the website content provided to the first computing device.

17. The system of claim 16, wherein:
the test-and-target service is further configured to simulate displaying of the website content based at least in part on the targeting rules and a selected user profile;
the live platform is configured to the website content and to provide, based at least in part on the targeting rules, a portion of the website content to a given segment of users; the UI is further configured to receive input indicating activation of the on-line promotional campaign; and
synchronizing the modifications to multiple remote computing devices further comprises:
providing the website content to the first computing device responsive to receiving the input indicating activation of the on-line promotional campaign, and providing the website content to the second computing device responsive to receiving the input specifying the modifications.

18. The system of claim 17, the operations further comprising:
in response to receiving input indicating activation of the website content:

storing the website content in the memory as published content;

replicating, by the content synchronization service and responsive to receiving the input indicating activation, the published content to the live platform; and uploading, by the content synchronization service, at least a portion of the website content to the second computing device hosting the test-and-target service.

19. A non-transitory computer readable storage medium having executable instructions stored thereon, that, when executed by a computing device, cause the computing device to perform operations, the instructions comprising:

instructions for receiving an indication of an on-line promotional campaign including a website component and multiple instances of the website component, wherein:

the website component comprises events and properties mapped to corresponding data elements to be tracked by an analytics service device, and further comprises a template for the multiple instances, and each instance of the multiple instances is associated with a set of targeting rules and a set of digital assets;

instructions for displaying, in a user interface (UI), visual indications of the multiple instances of the website component, wherein:

the UI is configured to receive input specifying modifications to one or more of the website component, the associated digital assets or the associated targeting rules, and the UI is further configured to display analytic information associated with one or more of the multiple instances; and instructions for receiving, via the UI, the input specifying modifications to one or more of the associated targeting rules, the associated digital assets, or the website component;

instructions for synchronizing, by a content synchronization service, the modifications to multiple remote computing devices responsive to receiving the input, wherein the synchronization includes:

providing, to a first computing device hosting a live platform, website content comprising the on-line promotional campaign and the website component, wherein the website content is configured to send analytics data measuring visitor interactions with the mapped events and properties of the website component to the analytics service device during use of the website content, and instructions for providing the website content to a second computing device hosting a test-and-target service, the test-and-target service being configured to display the website content and simulate the on-line promotional campaign and visitor interactions with the website component; and displaying, in the UI, at least a portion of the analytics data, the analytics data indicating a performance of the website content provided to the first computing device.

20. The non-transitory computer readable storage medium of claim 19, wherein the UI is further configured to display the website component and the events and properties, wherein the input specifying modifications selects how a particular one of the events and properties should be tracked, and the instructions further comprising, responsive to the selection of how the particular one of the events and properties should be tracked, associating the particular one of the events and properties with a data item from the analytics service device.

21. The non-transitory computer readable storage medium of claim 19, wherein:

the website content further comprises an analytics component having a mapping configuration associated with the events and properties of the website component, each instance of the multiple instances provides respective analytics data to the analytics component, and the analytics component consolidates the respective analytics data and provides the consolidated analytics data to the analytics service device.

\* \* \* \* \*